United States Patent
Okamoto et al.

(10) Patent No.: US 10,035,172 B2
(45) Date of Patent: Jul. 31, 2018

(54) POWDER COATING APPARATUS INCLUDING A UNIT THAT CHARGES AND FLUIDIZES A THERMOSETTING POWDER COATING MATERIAL

(71) Applicant: FUJI XEROX CO., LTD., Tokyo (JP)

(72) Inventors: Hideki Okamoto, Kanagawa (JP); Akihiko Noda, Kanagawa (JP); Yoichi Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 106 days.

(21) Appl. No.: 14/601,848

(22) Filed: Jan. 21, 2015

(65) Prior Publication Data

US 2016/0074900 A1    Mar. 17, 2016

(30) Foreign Application Priority Data

Sep. 17, 2014 (JP) .................. 2014-189434

(51) Int. Cl.

| | |
|---|---|
| *B05C 19/04* | (2006.01) |
| *B05C 9/14* | (2006.01) |
| *B05C 11/02* | (2006.01) |
| *B05D 1/26* | (2006.01) |
| *C23C 26/02* | (2006.01) |

(Continued)

(52) U.S. Cl.
CPC ............... *B05C 19/04* (2013.01); *B05C 9/14* (2013.01); *B05C 11/025* (2013.01); *B05D 1/26* (2013.01); *B05C 9/12* (2013.01); *B05C 19/06* (2013.01); *B05D 1/40* (2013.01); *B05D 3/0254* (2013.01);

(Continued)

(58) Field of Classification Search
CPC .... B22F 2003/1056; B22F 3/02; B22F 3/008; B23K 26/144; B23K 26/34; B29C 67/0077; B29C 67/0081; B29C 67/0085; C23C 24/08

See application file for complete search history.

(56) References Cited

U.S. PATENT DOCUMENTS

| | | | | |
|---|---|---|---|---|
| 4,200,669 A | * | 4/1980 | Schaefer | ........... C23C 4/137 |
| | | | | 219/121.6 |
| 5,038,014 A | * | 8/1991 | Pratt | ........... B22F 3/1055 |
| | | | | 219/121.64 |

(Continued)

FOREIGN PATENT DOCUMENTS

| | | |
|---|---|---|
| JP | S39-13225 | 7/1964 |
| JP | S49-39628 A | 4/1974 |

(Continued)

OTHER PUBLICATIONS

May 8, 2018 Office Action issued in Japanese Patent Application No. 2014-189434.

*Primary Examiner* — Karl Kurple
(74) *Attorney, Agent, or Firm* — Oliff PLC

(57) ABSTRACT

A powder coating apparatus includes an applying device that includes a charging and fluidizing unit charging and fluidizing a thermosetting powder coating material and applies the thermosetting powder coating material to a surface to be coated of an object to be coated while charging and fluidizing the powder coating material, a regulating device that regulates a thickness of a particle layer of the powder coating material applied to the surface to be coated of the object to be coated, and a heating device that heats the particle layer of the powder coating material to thermally cure the particle layer.

19 Claims, 2 Drawing Sheets

(51) Int. Cl.
   *B05C 9/12* (2006.01)
   *B05C 19/06* (2006.01)
   *B05D 3/06* (2006.01)
   *B05D 1/40* (2006.01)
   *B05D 3/02* (2006.01)

(52) U.S. Cl.
   CPC ............ *B05D 3/06* (2013.01); *B05D 2401/32* (2013.01); *C23C 26/02* (2013.01)

(56) References Cited

U.S. PATENT DOCUMENTS

| | | | | |
|---|---|---|---|---|
| 5,354,414 | A * | 10/1994 | Feygin | B22C 9/00 156/245 |
| 5,637,175 | A * | 6/1997 | Feygin | B33Y 30/00 156/256 |
| 5,749,041 | A * | 5/1998 | Lakshminarayan | B22F 3/1055 419/2 |
| 5,876,550 | A * | 3/1999 | Feygin | B22C 9/00 156/256 |
| 6,055,402 | A | 4/2000 | Angst et al. | |
| 6,214,279 | B1 * | 4/2001 | Yang | B29C 41/52 264/308 |
| 6,401,002 | B1 * | 6/2002 | Jang | G05B 19/4099 204/192.15 |
| 6,949,216 | B2 * | 9/2005 | Brice | B22F 3/008 252/502 |
| 7,020,539 | B1 * | 3/2006 | Kovacevic | B22F 3/1055 483/16 |
| 9,216,433 | B2 * | 12/2015 | Hasebe | B05B 13/0228 |
| 9,440,285 | B2 * | 9/2016 | Teulet | B22F 3/1055 |
| 9,718,129 | B2 * | 8/2017 | Ljungblad | B22F 3/1055 |
| 9,757,760 | B2 * | 9/2017 | Halder | B05C 11/044 |
| 2002/0053257 | A1 * | 5/2002 | Brice | B22F 3/008 75/229 |
| 2002/0164436 | A1 * | 11/2002 | Fischer | B23K 26/0823 427/595 |
| 2006/0119012 | A1 * | 6/2006 | Ruatta | B29C 67/0077 264/497 |
| 2007/0003427 | A1 * | 1/2007 | Yamamoto | B22F 3/005 419/66 |
| 2007/0183918 | A1 * | 8/2007 | Monsheimer | B29C 67/0077 419/1 |
| 2007/0298182 | A1 * | 12/2007 | Perret | B22F 3/1055 427/427.3 |
| 2011/0190904 | A1 * | 8/2011 | Lechmann | A61B 17/7208 623/23.61 |
| 2012/0285931 | A1 * | 11/2012 | Hayashikawa | H01S 3/036 219/68 |
| 2013/0186514 | A1 * | 7/2013 | Zhuang | B29C 67/0077 141/11 |
| 2014/0175708 | A1 * | 6/2014 | Echigo | B29C 67/0077 264/460 |
| 2014/0295095 | A1 * | 10/2014 | Langlois | B05C 19/04 427/482 |
| 2015/0101531 | A1 * | 4/2015 | Hasebe | B05B 13/0228 118/704 |

FOREIGN PATENT DOCUMENTS

| | | |
|---|---|---|
| JP | S49-57456 A | 6/1974 |
| JP | S63-044962 A | 2/1988 |
| JP | 02-074971 A | 3/1990 |
| JP | H9-108610 A | 4/1997 |
| JP | 11-073013 A | 3/1999 |
| JP | 2000-246150 | 9/2000 |
| JP | 2001-106959 A | 4/2001 |
| JP | 2005-211900 A | 8/2005 |
| JP | 2009-233484 A | 10/2009 |
| JP | 2011-527626 A | 11/2011 |

* cited by examiner

US 10,035,172 B2

POWDER COATING APPARATUS INCLUDING A UNIT THAT CHARGES AND FLUIDIZES A THERMOSETTING POWDER COATING MATERIAL

CROSS-REFERENCE TO RELATED APPLICATIONS

This application is based on and claims priority under 35 USC 119 from Japanese Patent Application No. 2014-189434 filed Sep. 17, 2014.

BACKGROUND

1. Technical Field

The present invention relates to a powder coating apparatus.

2. Related Art

Recently, a powder coating technology using a powder coating material discharges a small amount of volatile organic compound (VOC) in a coating step, and is able to collect and reuse a powder coating material which has not been attached to an object to be coated after coating, and thus has received attention in terms of the global environment.

SUMMARY

According to an aspect of the invention, there is provided a powder coating apparatus, including:

an applying device that includes a charging and fluidizing unit charging and fluidizing a thermosetting powder coating material and applies the thermosetting powder coating material to a surface to be coated of an object to be coated while charging and fluidizing the powder coating material;

a regulating device that regulates a thickness of a particle layer of the powder coating material applied to the surface to be coated of the object to be coated; and a heating device that heats the particle layer of the powder coating material to thermally cure the particle layer.

BRIEF DESCRIPTION OF THE DRAWINGS

Exemplary embodiments of the present invention will be described in detail based on the following figures, wherein.

DETAILED DESCRIPTION

Hereinafter, exemplary embodiments which are an example of the invention will be described in detail.

Figure 1:
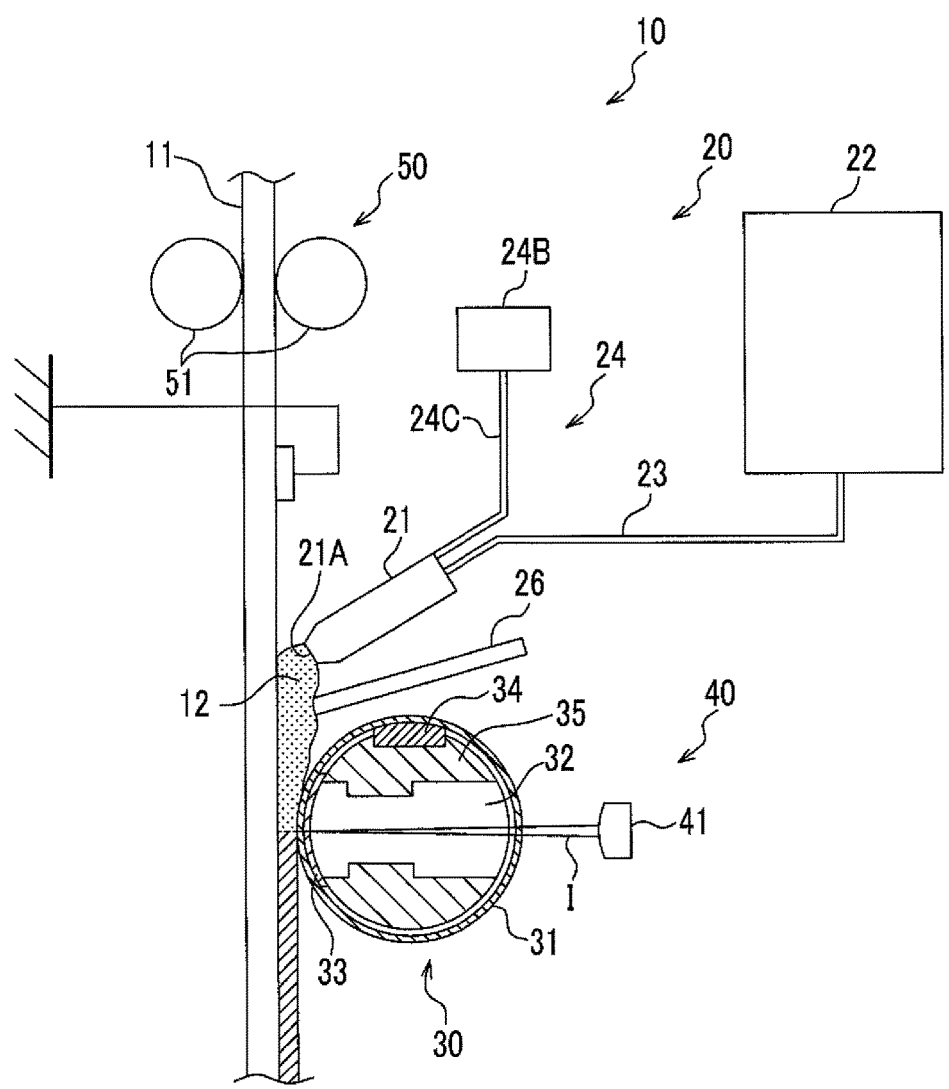
FIG. 1 is a schematic configuration diagram illustrating a powder coating apparatus according to this exemplary embodiment.
Figure 2:
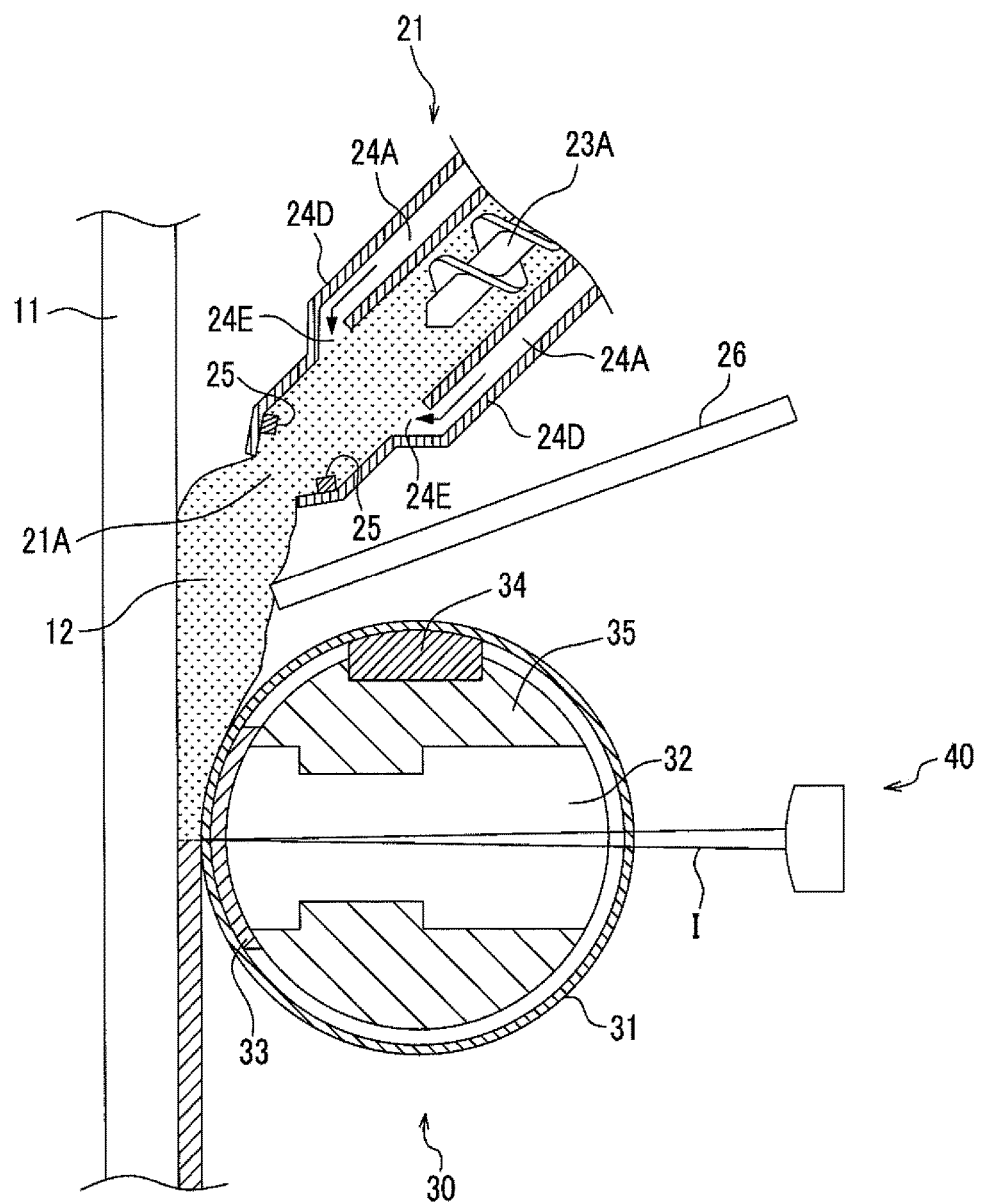
FIG. 2 is a partially enlarged schematic configuration diagram illustrating the powder coating apparatus according to this exemplary embodiment.

As illustrated in FIG. 1 and FIG. 2, a powder coating apparatus 10 according to this exemplary embodiment, for example, includes an applying device 20 supplying a thermosetting powder coating material 12 to a surface to be coated of an object to be coated 11, a regulating device 30 regulating a thickness of a powder particle layer (hereinafter, referred to as a "particle layer of the powder coating material 12") of the powder coating material 12 applied to the surface to be coated of the object to be coated 11, and a heating device 40 heating and thermally curing the particle layer of the powder coating material 12. In addition, the powder coating apparatus 10, for example, also includes a movement device 50 moving the surface to be coated of the object to be coated 11.

Object to be Coated

As the object to be coated 11, for example, a plate-shape member formed of metal, ceramic, or a resin and the like are included. The surface to be coated of the object to be coated 11 may be subjected to a surface treatment such as a primer treatment, a plating treatment, and an electrodeposition coating in advance.

At least the surface to be coated of the object to be coated 11 may have conductivity from a point of electrostatically attaching the powder coating material 12. Here, conductivity indicates that volume resistivity is less than or equal to $10^{13}$ Ωcm. Then, from a point of electrostatically attaching the powder coating material 12, a voltage may be applied to the object to be coated 11 or the object to be coated 11 may be grounded (earthed) such that a polarity of the surface to be coated is opposite to a polarity of the charged powder coating material 12.

Furthermore, in this exemplary embodiment, a case where a conductive steel plate is applied as the object to be coated 11, and the conductive steel plate is grounded is described.

Applying Device

The applying device 20, for example, includes a tubular applying unit 21 including an applying port 21A arranged to face the surface to be coated of the object to be coated 11, a storage portion 22 which is connected to the applying unit 21 and stores the powder coating material 12 to be supplied to the applying unit 21, and a transporting pipe 23 for transporting the powder coating material 12 to the applying unit 21 from the storage portion 22, which connects the tubular applying unit 21 and the storage portion 22. Then, in an inner portion of the transporting pipe 23, a stirring and transporting member 23A (for example, a member having a spiral blade on a shaft core, or the like) which transports the powder coating material 12 while stirring the powder coating material 12 is included.

In the applying device 20, a gas inflow portion 24 (an example of the charging and fluidizing unit) allowing gas to flow to the powder coating material 12 supplied to the applying unit 21 is also provided.

The gas inflow portion 24, for example, includes a gas inflow path 24A disposed in the applying unit 21, a pump 24B sucking and discharging gas (for example, ambient air), and a gas inflow pipe 24C connecting the gas inflow path 24A and the pump 243.

The gas inflow path 24A, for example, is configured by a space between an outer wall surface of the tubular applying unit 21 and an inner wall surface of a tubular portion 24D which is slightly larger than the tubular applying unit 21. Then, a downstream end of the gas inflow path 24A in a gas inflow direction is connected to an inner portion of the cylindrical applying unit 21 through a gas inflow port 24E disposed in the tubular applying unit 21.

Furthermore, as the pump 24B, a known pump 24B such as an air pump is applied.

In the gas inflow portion 24, for example, gas flows from the gas inflow port 24E to the powder coating material 12 in the applying unit 21 through the gas inflow pipe 24C and the gas inflow path 24A by the pump 24B. Accordingly, powder particles in the powder coating material 12 are scattered from each other and rubbed against each other, and thus are charged and fluidized.

Furthermore, the gas inflow direction of the powder coating material 12 is not particularly limited, and the gas may flow to the powder coating material 12 in a direction identical to a flux direction of the powder coating material 12, a direction intersecting with the flux direction, or a direction opposite to the flux direction. By adjusting the gas inflow direction and a gas inflow amount, the powder coating material 12 is scattered and fluidized in the inner portion of the applying unit 21, and is easily triboelectrically charged.

On the other hand, in the applying unit 21, an oscillation-imparting unit 25 (an example of a charging and fluidizing unit) imparting oscillation to the powder coating material 12 supplied to the applying unit 21 is disposed. Specifically, the oscillation-imparting unit 25, for example, is disposed in an inner wall surface around an edge portion of the applying port 21A in the applying unit 21. Then, the oscillation-imparting unit 25, for example, is configured by an ultrasonic oscillator (for example, a piezo element or the like).

The oscillation-imparting unit 25 imparts oscillation to the powder coating material 12 in the applying unit 21. Accordingly, the powder particles in the powder coating material 12 are scattered from each other and rubbed against each other, and are charged and fluidized. In particular, when oscillation is imparted to the powder coating material 12 from around the edge portion of the applying port 21A, the charged and fluidized powder coating material 12 is easily applied to the coating surface of the object to be coated 11 with high density and high smoothness.

A damming plate 26 damming the applied powder coating material 12 between the applying port 21A and the regulating device 30 is disposed around the applying port 21A of the applying unit 21.

Regulating Device

The regulating device 30 includes a cylindrical member 31 regulating the thickness of the particle layer of the powder coating material 12 applied to the coating surface of the object to be coated 11. Then, the cylindrical member 31 is disposed to be separated from the surface to be coated of the object to be coated 11 according to the surface to be coated of the object to be coated 11 and the thickness of the particle layer of the powder coating material 12 to be regulated.

In an inner portion of the cylindrical member 31, for example, a lens member 32 focusing a laser beam, a sliding member 33 disposed between an inner circumferential surface of the cylindrical member 31 and the lens member 32, and a lubricant-supplying member 34 supplying a lubricant to the inner circumferential surface of the cylindrical member 31 are disposed. The lens member 32, the sliding member 33, and the lubricant-supplying member 34 are supported by a supporting member 35.

The cylindrical member 31, for example, contacts the particle layer of the powder coating material 12 applied to the coating surface of the object to be coated 11 while being rotated by a driving source (not illustrated), and thus regulates the thickness of the particle layer of the powder coating material 12. A rotating direction of the cylindrical member 31 may be a direction identical to a movement direction of the surface to be coated of the object to be coated 11, or may be a direction opposite to the movement direction. That is, a movement direction of an outer circumferential surface of the cylindrical member 31 facing the surface to be coated of the object to be coated 11 may be identical to the movement direction of the surface to be coated of the object to be coated 11, or may be opposite to the movement direction. Furthermore, the lens member 32, the sliding member 33, and the lubricant-supplying member 34 are not rotated, and are fixed by the supporting member 35.

The cylindrical member 31, for example, is configured of a resin, glass, or the like. The cylindrical member 31 has a property of transmitting light (a laser beam) from a light irradiation unit 41 (a light source thereof) of the heating device 40 described later. Having a property of transmitting light indicates that transmittance of light is greater than or equal to 80% (preferably, greater than or equal to 90%). The same applies hereinafter.

The lens member 32 is a lens focusing the laser beam from the light irradiation unit 41 (the light source thereof) of the heating device 40 described later. The lens member 32, for example, is configured of glass, or an acrylic resin (PMMA or the like).

The sliding member 33 is disposed to be in contact with surfaces of the lens member 32 and the cylindrical member 31 facing each other. The sliding member 33 decreases sliding resistance between the inner circumferential surface of the cylindrical member 31 and the lens member 32, and prevents an occurrence of damage due to direct contact between the inner circumferential surface of the cylindrical member 31 and the lens member 32.

The sliding member 33, for example, is configured of rubber (urethane rubber, olefin rubber, and the like) in which a lubricating filler (PTFE or the like) is dispersed; a PFA resin reinforced by fiber (glass fiber or the like); silicone rubber in which silicone oil, a silicon surfactant, or the like is impregnated in or which is subjected to a surface treatment, and the like. The sliding member 33 also has a property of transmitting the laser beam from the light source of the heating device 40 described later.

The lubricant-supplying member 34 is disposed to be in contact with the inner circumferential surface of the cylindrical member 31. The cylindrical member 31 is rotated, and thus a lubricant is supplied to the inner circumferential surface of the cylindrical member 31 from the lubricant-supplying member 34. Accordingly, the cylindrical member 31 is smoothly rotated.

The lubricant-supplying member 34, for example, is configured by a lubricant, and a retaining member retaining the lubricant. As the lubricant, for example, silicone oil, paraffin oil, fluorine oil, synthetic lubricant oil, wax, and the like are included.

Furthermore, the regulating device 30 is not limited to the configuration described above. For example, when the light (the laser beam) from the light irradiation unit 41 (the light source thereof) of the heating device 40 described later has an output of heating and thermally curing the particle layer of the powder coating material 12, the regulating device 30 may have 1) a configuration in which the lens member 32 is not disposed, or a light transmitting member is disposed instead of the lens member 32, or 2) a configuration in which the lens member 32, the sliding member 33, and the lubricant-supplying member 34 are not disposed, but the cylindrical member 31 or a columnar member is simply disposed.

Heating Device

The heating device 40, for example, includes the light irradiation unit 41. The light irradiation unit 41, for example, is configured by a light source emitting a laser beam, and a driving unit thereof (not illustrated). As the light source, for example, a light source (semiconductor laser, solid state laser, and the like) emitting an infrared ray laser beam having a wavelength from 760 nm to 900 nm is applied. Furthermore, in FIG. 1 and FIG. 2, "I" indicates a laser beam.

In the heating device 40, when the thickness of the particle layer of the powder coating material 12 is regulated by the regulating device 30, the particle layer of the powder coating material 12 is irradiated with light. Specifically, for example, the laser beam emitted from the light irradiation unit 41 (the light source thereof) as the heating device 40 is focused by the lens member 32 arranged in the inner portion of the cylindrical member 31, and then is applied to the particle layer of the powder coating material 12. Accordingly, the particle layer of the powder coating material 12 in a state where the thickness is regulated by being in contact with the cylindrical member 31 is heated and thermally cured.

Furthermore, the heating device 40 is not limited to the configuration described above. The heating device 40 may be disposed in the inner portion of the cylindrical member 31 of the regulating device 30. In this configuration, the heating device 40 is disposed in the inner portion of the cylindrical member 31 of the regulating device 30, together with the lens member 32 or instead of the lens member 32.

In addition, the heating device 40 may include a heating unit provided with a heat source such as a halogen heater instead of the light irradiation unit 41 provided with the light source. For example, the heating unit provided with the heat source is arranged in the inner portion of the cylindrical member 31 of the regulating device 30, and the particle layer of the powder coating material in a state where the thickness is regulated by being in contact with the cylindrical member 31 is heated and thermally cured by heat from the heat source. On the other hand, the heating unit provided with the heat source may be arranged to heat the inner circumferential surface of the cylindrical member 31 of the regulating device 30 or the outer circumferential surface, may regulate the thickness of the particle layer of the powder coating material 12 by the heated cylindrical member 31, and may heat and thermally cure the particle layer of the powder coating material 12.

In addition, the heating device 40 may regulate the thickness of the particle layer of the powder coating material 12 by the regulating device 30, and then may heat and thermally cure the particle layer of the powder coating material 12. That is, the heating device 40 may be arranged on a downstream side from the regulating device 30 in the movement direction of the coating surface of the object to be coated 11.

Movement Device

The movement device 50, for example, includes a pair of transporting rolls 51, and a roll driving unit (for example, a motor) (not illustrated). One pair of transporting rolls 51 or plural pairs of transporting rolls 51 are disposed. The movement device 50 may include a transport belt together with the pair of transporting rolls 51, or instead of the pair of transporting rolls 51.

Operation

In the powder coating apparatus 10 according to this exemplary embodiment, the object to be coated 11 is transported by the transporting roll 51 of the movement device 50. Accordingly, the surface to be coated of the object to be coated 11 is moved.

On the other hand, in the applying device 20, the powder coating material 12 stored in the storage portion 22 is transported to the applying unit 21 through the transporting pipe 23 by the stirring and transporting member 23A. Next, gas flows to the powder coating material 12 transported to the applying unit 21 by the gas inflow portion 24. In addition, oscillation is imparted to the powder coating material 12 transported to the applying unit 21 by the oscillation-imparting unit 25. Accordingly, the powder coating material 12 is charged and fluidized.

Then, a thermosetting powder coating material is applied to the moving surface to be coated of the object to be coated 11 while being charged and fluidized.

Next, the thickness of the particle layer of the powder coating material 12 applied to the surface to be coated of the object to be coated 11 is regulated by the regulating device 30. Specifically, the regulating device 30 is in contact with the particle layer of the powder coating material 12 according to transport of the object to be coated 11 in a state where the cylindrical member 31 of the regulating device 30 is rotated. At this time, the regulating device 30 scrapes a surface layer portion of the particle layer of the powder coating material 12 by being in contact with the cylindrical member 31 according to a separation distance between the cylindrical member 31 and the coating surface of the object to be coated 11, and regulates the thickness of the particle layer of the powder coating material 12.

On the other hand, in the heating device 40, a laser beam is emitted from the light source of the light irradiation unit 41. The laser beam is focused by the lens member 32 of the regulating device 30, and then the particle layer of the powder coating material 12 in a state where the thickness is regulated by the cylindrical member 31 is irradiated with the focused laser beam. Accordingly, the particle layer of the powder coating material 12 is heated and thermally cured.

Furthermore, a heating temperature (a baking temperature) of the particle layer of the powder coating material 12, for example, is preferably from 90° C. to 250° C., is more preferably from 100° C. to 220° C., and is further preferably from 120° C. to 200° C.

Through the following steps, the coating surface of the object to be coated is coated with the powder coating material by forming a coating film thereon.

Furthermore, a thickness of the coating film of the powder coating material 12 is set according to a purpose, and for example, may be from 30 µm to 50 µm.

In the powder coating apparatus 10 according to this exemplary embodiment described above, the thermosetting powder coating material 12 is applied to the coating surface of the object to be coated 11 by the applying device 20 while being charged and fluidized. After that, the thickness particle layer of the powder coating material 12 applied to the surface to be coated of the object to be coated 11 is regulated by the regulating device 30, and then the particle layer of the powder coating material 12 is heated and thermally cured by the heating device 40. In a series of this flow, the coating surface of the object to be coated is coated with the powder coating material by forming the coating film thereon. Then, the formed coating film is controlled in regulation of the regulating device 30.

For this reason, in the powder coating apparatus 10 according to this exemplary embodiment, the thickness of the coating film is controlled with high productivity.

In addition, in the powder coating apparatus 10, when the charged and fluidized powder coating material 12 is applied, the powder coating material 12 spreads to an edge portion of the surface to be coated of the object to be coated 11 in a width direction (an edge portion in a direction intersecting with a transporting direction of the object to be coated 11), and is electrostatically attached to the surface to be coated of the object to be coated 11. Accordingly, the particle layer of the powder coating material 12 is formed on the surface to be coated of the object to be coated 11. That is, an entire region of the surface to be coated of the object to be coated is coated with the powder coating material 12.

In addition, in the powder coating apparatus 10, the thickness of the particle layer of the powder coating material 12 is regulated by the cylindrical member 31 of the regulating device 30 by being in contact with the particle layer of the powder coating material 12. That is, the thickness of the particle layer of the powder coating material 12 is regulated by being in contact with the curved outer circumferential surface of the cylindrical member 31, and thus surfaces of the particle layer of the powder coating material 12 are hardly disturbed. For this reason, the coating film having high smoothness is easily formed.

In addition, in the powder coating apparatus 10, the thickness of the particle layer of the powder coating material 12 is regulated by being in contact with the particle layer of the powder coating material 12 while the cylindrical member 31 of the regulating device 30 is rotated. When the cylindrical member 31 is rotated, only the surface layer portion of the particle layer of the powder coating material 12 is stably and easily scraped. For this reason, the coating film having high smoothness is easily formed.

In addition, in the powder coating apparatus 10, the powder coating material 12 is charged and fluidized by imparting oscillation by the oscillation-imparting unit 25 in addition to inflow of gas by the gas inflow portion 24, and is applied to the coating surface of the object to be coated 11. The powder coating material 12 to which the gas flows and the oscillation is imparted is highly and easily charged and fluidized in a short time. Then, when the powder coating material 12 in this state is applied to the surface to be coated of the object to be coated 11, the particle layer of the powder coating material 12 in a minutely close state is easily formed. For this reason, the thickness of the coating film is easily controlled with high productivity.

Further, the powder coating material 12 is highly charged and fluidized, and thus the powder coating material 12 easily spreads to the edge portion of the surface to be coated of the object to be coated 11 in the width direction, and is easily electrostatically attached to the surface to be coated of the object to be coated 11. For this reason, the entire region of the surface to be coated of the object to be coated is easily coated with the powder coating material 12 having high smoothness.

In addition, in the powder coating apparatus 10, when the thickness of the particle layer of the powder coating material 12 is regulated by the regulating device 30, the particle layer of the powder coating material 12 is irradiated with light (the laser beam in this exemplary embodiment) by heating device 40 (the light irradiation unit in this exemplary embodiment), and thus the particle layer of the powder coating material 12 is heated. That is, in a state where the particle layer of the powder coating material 12 is in contact with the regulating device 30 (the outer circumferential surface of the cylindrical member 31 in this exemplary embodiment), the particle layer of the powder coating material 12 is heated and thermally cured by the heating device 40. For this reason, the coating film having high smoothness is easily formed.

The powder coating apparatus 10 is not limited to the configuration described above, and may have a configuration in which the surface to be coated of the object to be coated 11, the applying device 20, the regulating device 30, and the heating device 40 are relatively moved. That is, the applying device 20, the regulating device 30, and the heating device 40 may be moved with respect to the surface to be coated of the object to be coated 11.

Hereinafter, a suitable thermosetting powder coating material 12 applied to the powder coating apparatus 10 according to this exemplary embodiment will be described, the reference numeral thereof is omitted, and is described as the powder coating material according to this exemplary embodiment.

The powder coating material according to this exemplary embodiment includes the powder particles having a core including a thermosetting resin and a thermosetting agent, and a resin covering portion covering a surface of the core.

Then, a volume particle size distribution index GSDv of the powder particles is less than or equal to 1.50, and average circularity of the powder particles is greater than or equal to 0.96.

Furthermore, the powder coating material according to this exemplary embodiment may be either of a transparent powder coating material (a clear coating material) not including a coloring agent in the powder particles and a colored powder coating material including a coloring agent in the powder particles.

According to the configuration described above, the powder coating material according to this exemplary embodiment forms the coating film having high smoothness in a small amount and has high preservability even when a diameter of the powder particles is reduced. The reason of this is not clear, but the following reasons are assumed.

First, recently, there has been a demand for forming a thin coating film with a small amount of powder coating material in coating of the powder coating material. For this reason, it is necessary that the diameter of the powder particles of the powder coating material be reduced. However, when the diameter of the powder particles is simply reduced by a kneading and pulverizing method or the like, a fine powder is generated, and thus a particle size distribution is widened, and a coarse powder and a fine powder increase. In addition, the powder particles easily have a different shape.

When the coarse powder of the powder particles increases, and thus concavities and convexities are formed on the surface of the coating film due to the coarse powder, and the coating film having low smoothness is easily formed. When the fine powder of the powder particles increases, fluidity of the powder particles decreases, and the powder particles are easily aggregated, and thus the coating film having low smoothness is easily formed. When the powder particles have a different shape, fluidity of the powder particles decreases, and the powder particles are easily aggregated (blocked), and thus the coating film having low smoothness is formed. Further, when the powder particles have a different shape, a gap between the powder particles increases at the time of being attached to the surface to be coated, and thus concavities and convexities are formed on the surface of the coating film after heating, and the coating film having low smoothness is easily formed.

Therefore, the volume particle size distribution index GSDv of the powder particles is less than or equal to 1.50. That is, a particle size distribution of the powder particles is narrowed, and the coarse powder and the fine powder decrease. Accordingly, even when the diameter of the powder particles is reduced, a decrease in fluidity and aggregation (blocking) of the powder particles are prevented.

Then, the average circularity of the powder particles is greater than or equal to 0.96, and a shape of the powder particles is close to a spherical shape. That is, even when the diameter of the powder particles is reduced, a decrease in fluidity is prevented. In addition, a contact area between the powder particles decreases, and a gap between the powder particles decreases at the time of being attached to the surface to be coated.

On the other hand, when the diameter of the powder particles is reduced, a distance from an inner portion of the powder particles to the surface is reduced, and thus a phenomenon (hereinafter, referred to as "bleed") in which an inclusion (an additive such as a coloring agent, a leveling agent, and a flame retardant which is added as necessary in addition to a thermosetting agent and a thermosetting agent) in the powder particles is precipitated easily occurs over time. When this bleed occurs, the powder particles are aggregated (blocked), and thus preservability decreases.

Therefore, as the powder particles, particles which include particles (that is, particles functioning as the powder coating material) including a thermosetting resin and a thermosetting agent as a core, and a resin covering portion on a surface of the core is applied. When the powder particles have this layer configuration, the resin covering portion functions as a partitioning wall, and thus the inclusion such as the thermosetting agent included in the core is prevented from being bled to surfaces of the powder particles.

As described above, it is assumed that the powder coating material according to this exemplary embodiment forms the coating film having high smoothness in a small amount even when the diameter of the powder particles is reduced, and has high preservability.

In addition, the powder coating material according to this exemplary embodiment is the coating film having high smoothness in a small amount even when the diameter of the powder particles is reduced, and thus glossiness of the obtained coating film also increases.

Further, the powder coating material according to this exemplary embodiment has high preservability, and thus even when the powder coating material which has not been attached to the surface to be coated is reused after powder coating, similarly, the coating film having high smoothness is formed in a small amount. For this reason, the powder coating material according to this exemplary embodiment has high durability. In addition, the powder coating material according to this exemplary embodiment has high fluidity, and thus has high transporting efficiency and coating efficiency and excellent coating workability.

Furthermore, in JP-A-2001-106959, "spherical thermosetting powder clear coating material particles including an acrylic resin A and an acrylic resin B in which (a) (an SP value of the acrylic resin A)–(an SP value of the acrylic resin B) is 0.5 to 1.5, and an average particle diameter/a number average particle diameter is less than or equal to 2" is disclosed, but a resin covering portion which functions as a partitioning wall is not definitely formed on a surface layer portion of the coating material particles, and thus when a diameter of the coating material powder is reduced, an inclusion is easily bled. In addition, in JP-A-2005-211900, "a powder coating method including a step of covering a conductive surface or a layer on the surface with a powder and forming a coating on the surface or the layer in which the powder is formed by aggregating and coalescing particles in an aqueous dispersed material, and the particles include resin particles" is disclosed, but a resin covering portion which functions as a partitioning wall is not formed on a surface layer portion of the powder (the particles), and thus when a diameter of the coating material powder is reduced, an inclusion is easily bled. For this reason, the powder coating material according to this exemplary embodiment is preferable in this point.

Hereinafter, the powder coating material according to this exemplary embodiment will be described in detail.

The powder coating material according to this exemplary embodiment includes the powder particles. The powder coating material, as necessary, may include an external additive attached to the surfaces of the powder particles in terms of increasing fluidity.

Powder Particles

The powder particles include the core, and the resin covering portion attached to the surfaces of the core. That is, the powder particles are particles having a core-shell structure.

Property of Powder Particles

The volume particle size distribution index GSDv of the powder particles is less than or equal to 1.50, is preferably less than or equal to 1.40 in terms of smoothness of the coating film and preservability of the powder coating material, and is more preferably less than or equal to 1.30.

A volume average particle diameter D50v of the powder particles is preferably from 1 μm to 25 μm in terms of forming the coating film having high smoothness in small amount, is more preferably from 2 μm to 20 μm, and is further preferably from 3 μm to 15 μm.

The average circularity of the powder particles is greater than or equal to 0.96, is preferably greater than or equal to 0.97 in terms of smoothness of the coating film and preservability of the powder coating material, and is more preferably greater than or equal to 0.98.

Here, the volume average particle diameter D50v and the volume particle size distribution index GSDv of the powder particles are measured by using Coulter Multisizer II (manufactured by Beckman-Coulter Inc.) and ISOTON-II (manufactured by Beckman-Coulter Inc.) as an electrolysis solution.

In the measurement, from 0.5 mg to 50 mg of a measurement sample is added to 2 ml of an aqueous solution including 5% of a surfactant (sodium alkylbenzene sulfonate is preferable) as a dispersant. This is added to 100 ml to 150 ml of the electrolysis solution.

The electrolysis solution in which the sample is suspended is subjected to a dispersion treatment for 1 minute by using an ultrasonic disperser, and thus the particle size distribution of the particles having a particle diameter in a range from 2 μm to 60 μm is measured by an aperture of 100 μm as an aperture diameter using Coulter Multisizer II. Furthermore, the number of particles to be sampled is 50000.

A cumulative distribution of volume is drawn from a small diameter side with respect to a particle size range (a channel) divided on the basis of the measured particle size distribution, a particle diameter having a cumulation of 16% is defined as a volume particle diameter D16v, a particle diameter having a cumulation of 50% is defined as a volume average particle diameter D50v, and a particle diameter having a cumulation of 84% is defined as a volume particle diameter D84v.

Then, the volume average particle size distribution index (GSDv) is calculated as $(D84v/D16v)^{1/2}$.

The average circularity of the powder particles is measured by using a flow type particle image analyzer "FPIA-3000 (manufactured by Sysmex Corporation)". Specifically, from 0.1 ml to 0.5 ml of a surfactant (alkyl benzene sulfonate) as a dispersant is added from 100 ml to 150 ml of water from which solid impurities are removed in advance, and from 0.1 g to 0.5 g of a measurement sample is further added. A suspension liquid in which the measurement sample is dispersed is subjected to a dispersion treatment for 1 minute to 3 minutes by an ultrasonic disperser, and dispersion concentration is from 3000 samples/μl to 10000 samples/μl. In this dispersion, the average circularity of the powder particles is measured by using a flow type particle image analyzer.

Here, the average circularity of the powder particles is a value calculated by obtaining circularity (Ci) of each of n particles measured with respect to the powder particles, and then by calculating the following expression. Here, in the following expression, Ci represents circularity (=a boundary length of a circle identical to a projection area of the particles/a boundary length of a particle projection image), and fi represents a frequency of the powder particles.

$$\text{Average Circularity }(Ca) = \left(\sum_{i=1}^{n}(Ci \times fi)\right) \Big/ \sum_{i=1}^{n}(fi) \qquad \text{Expression 1}$$

Core

The core includes a thermosetting resin and a thermosetting agent. The core, as necessary, may include other additives such as a coloring agent.

Curable Resin

The thermosetting resin is a resin having a thermally curable reactive group. As the thermosetting resin, in the related art, various types of resins used for the powder particles of the powder coating material are included.

The thermosetting resin may be an insoluble (hydrophobic) resin. When the insoluble (hydrophobic) resin is applied as the thermosetting resin, environmental dependency of a charging property of the powder coating material (the powder particles) decreases. In addition, when the powder particles are prepared by an aggregation and coalescence method, the thermosetting resin may be an insoluble (hydrophobic) resin in terms of realizing emulsification dispersion in an aqueous medium. Furthermore, insoluble (hydrophobic) indicates that an amount of dissolution of a target substance with respect to 100 parts by weight of water at 25° C. is less than 5 parts by weight.

Among the thermosetting resins, at least one selected from the group consisting of a thermosetting (meth)acrylic resin and a thermosetting polyester resin is preferable.

Thermosetting (Meth)Acrylic Resin

The thermosetting (meth)acrylic resin is a (meth)acrylic resin having a thermally curable reactive group. In order to introduce the thermally curable reactive group into the thermosetting (meth)acrylic resin, a vinyl monomer having a thermally curable reactive group may be used. The vinyl monomer having a thermally curable reactive group may be a (meth)acrylic monomer (a monomer having a (meth)acryloyl group), or may be a vinyl monomer other than the (meth)acrylic monomer.

Here, as the thermally curable reactive group of the thermosetting (meth)acrylic resin, for example, an epoxy group, a carboxyl group, a hydroxyl group, an amide group, an amino group, an acid anhydride group, a (block) isocyanate group, and the like are included. Among them, as the thermally curable reactive group of the (meth)acrylic resin, at least one selected from the group consisting of an epoxy group, a carboxyl group, and a hydroxyl group is preferable in terms of easily manufacturing the (meth)acrylic resin. In particular, it is preferable that at least one of the curable reactive groups be an epoxy group in terms of excellent storage stability of the powder coating material and excellent coating film appearance.

As the vinyl monomer having an epoxy group as the thermally curable reactive group, for example, various monomers containing a chain epoxy group (for example, glycidyl (meth)acrylate, β-methyl glycidyl (meth)acrylate, glycidyl vinyl ether, allyl glycidyl ether, and the like), various vinyl monomers containing a (2-oxo-1,3-oxolane) group (for example, (2-oxo-1,3-oxolane)methyl (meth)acrylate, and the like), various vinyl monomers containing an alicyclic epoxy group (for example, 3,4-epoxy cyclohexyl (meth)acrylate, 3,4-epoxy cyclohexyl methyl (meth)acrylate, 3,4-epoxy cyclohexyl ethyl (meth)acrylate, and the like), and the like are included.

As the vinyl monomer having a carboxyl group as the thermally curable reactive group, for example, various monomers containing a carboxyl group (for example, a (meth)acrylic acid, a crotonic acid, an itaconic acid, a maleic acid, a fumaric acid, and the like), various monoesters of an α,β-unsaturated dicarboxylic acid and a monovalent alcohol having carbon atoms from 1 to 18 (for example, fumaric acid monomethyl, fumaric acid monoethyl, fumaric acid monobutyl, fumaric acid monoisobutyl, fumaric acid mono-tert-butyl, fumaric acid monohexyl, fumaric acid monooctyl, fumaric acid mono-2-ethyl hexyl, maleic acid monomethyl, maleic acid monoethyl, maleic acid monobutyl, maleic acid monoisobutyl, maleic acid mono-tert-butyl, maleic acid monohexyl, maleic acid monooctyl, maleic acid mono-2-ethyl hexyl, and the like), itaconic acid monoalkyl ester (for example, itaconic acid monomethyl, itaconic acid monoethyl, itaconic acid monobutyl, itaconic acid monoisobutyl, itaconic acid monohexyl, itaconic acid monooctyl itaconic acid mono-2-ethyl hexyl, and the like), and the like are included.

As the vinyl monomer having a hydroxyl group as the thermally curable reactive group, for example, various (meth)acrylates containing a hydroxyl group (for example, 2-hydroxy ethyl (meth)acrylate, 2-hydroxy propyl (meth)acrylate, 3-hydroxy propyl (meth)acrylate, 2-hydroxy butyl (meth)acrylate, 3-hydroxy butyl (meth)acrylate, 4-hydroxy butyl (meth)acrylate, polyethylene glycol mono(meth)acrylate, polypropylene glycol mono(meth)acrylate, and the like), an addition reaction product of the various (meth)acrylates containing a hydroxyl group and ε-caprolactone, various vinyl ethers containing a hydroxyl group (for example, 2-hydroxy ethyl vinyl ether, 3-hydroxy propyl vinyl ether, 2-hydroxy propyl vinyl ether, 4-hydroxy butyl vinyl ether, 3-hydroxy butyl vinyl ether, 2-hydroxy-2-methyl propyl vinyl ether, 5-hydroxy pentyl vinyl ether, 6-hydroxy hexyl vinyl ether, and the like), an addition reaction product of the various vinyl ethers containing a hydroxyl group and ε-caprolactone, various allyl ethers containing a hydroxyl group (for example, 2-hydroxy ethyl (meth)allyl ether, 3-hydroxy propyl (meth)allyl ether, 2-hydroxy propyl (meth)allyl ether, 4-hydroxy butyl (meth)allyl ether, 3-hydroxy butyl (meth)allyl ether, 2-hydroxy-2-methyl propyl (meth)allyl ether, 5-hydroxy pentyl (meth)allyl ether, 6-hydroxyhexyl (meth)allyl ether, and the like), an addition reaction product of the various allyl ethers containing a hydroxyl group and ε-caprolactone, and the like are included.

For the thermosetting (meth)acrylic resin, other vinyl monomers not having a curable reactive group besides the (meth)acrylic monomer may be copolymerized.

As the other vinyl monomer, various α-olefins (for example, ethylene, propylene, butene-1, and the like), various halogenated olefins excluding fluoroolefin (for example, vinyl chloride, vinylidene chloride, and the like), various aromatic vinyl monomers (for example, styrene, α-methyl styrene, vinyl toluene, and the like), various diesters of an unsaturated dicarboxylic acid and monovalent alcohol having carbon atoms from 1 to 18 (for example, fumaric acid dimethyl, fumaric acid diethyl, fumaric acid dibutyl, fumaric acid dioctyl, maleic acid dimethyl, maleic acid diethyl, maleic acid dibutyl, maleic acid dioctyl, itaconic acid dimethyl, itaconic acid diethyl, itaconic acid dibutyl, itaconic acid dioctyl, and the like), various monomers containing an acid anhydride group (for example, maleic anhydride, itaconic anhydride, citraconic anhydride, (meth)acrylic anhydride, tetrahydrophthalic anhydride, and the like), various monomers containing a phosphoric acid ester group (for example, diethyl-2-(meth)acryloyloxy ethyl phosphate, dibutyl-2-(meth)acryloyloxy butyl phosphate, dioctyl-2-(meth)acryloyloxy ethyl phosphate, diphenyl-2-(meth)acryloyloxy ethyl phosphate, and the like), various monomers containing a hydrolyzable silyl group (for example, γ-(meth)acryloyloxy propyl trimethoxysilane, γ-(meth)acryloyloxy propyl triethoxysilane, γ-(meth)acryloyloxy propyl methyl dimethoxysilane, and the like), various aliphatic vinyl carboxylate (for example, vinyl acetate, vinyl propionate, vinyl butyrate, vinyl isobutyrate, vinyl caproate, vinyl caprylate, vinyl caprate, vinyl laurate, branched aliphatic vinyl carboxylate having carbon atoms from 9 to 11, vinyl stearate, and the like), various vinyl esters of a carboxylic acid having a cyclic structure (for example, vinyl cyclohexane carboxylate, methyl vinyl cyclohexane carboxylate, vinyl benzoate, p-tert-butyl vinyl benzoate, and the like), and the like are included.

Furthermore, in the thermosetting (meth)acrylic resin, when vinyl monomers other than the (meth)acrylic monomer are used as the vinyl monomer having a thermally curable reactive group, an acrylic monomer not having a thermally curable reactive group is used.

As the acrylic monomer not having a thermally curable reactive group, (meth)acrylic acid alkyl ester (for example, (meth)acrylic acid methyl, (meth)acrylic acid ethyl, (meth)acrylic acid n-propyl, (meth)acrylic acid isopropyl, (meth)acrylic acid n-butyl, (meth)acrylic acid isobutyl, (meth)acrylic acid tert-butyl, (meth)acrylic acid n-hexyl, (meth)acrylic acid cyclohexyl, (meth)acrylic acid 2-ethyl hexyl, (meth)acrylic acid n-octyl, (meth)acrylic acid isooctyl, (meth)acrylic acid 2-ethyl octyl, (meth)acrylic acid dodecyl, (meth)acrylic acid isodecyl, (meth)acrylic acid lauryl, (meth)acrylic acid stearyl, and the like), various (meth)acrylic acid aryl esters (for example, (meth)acrylic acid benzyl, (meth)acrylic acid phenyl, (meth)acrylic acid phenoxy ethyl, and the like), various alkyl carbitol (meth)acrylates (for example, ethyl carbitol (meth)acrylate, and the like), other various (meth)acrylic acid esters (for example, isobornyl (meth)acrylate, dicyclopentanyl (meth)acrylate, dicyclopentenyl (meth)acrylate, dicyclopentenyloxy ethyl (meth)acrylate, (meth)acrylic acid tetrahydrofurfuryl, and the like), various amide unsaturated monomers containing an amino group (for example, N-dimethyl aminoethyl (meth)acrylamide, N-diethyl aminoethyl (meth)acrylamide, N-dimethyl aminopropyl (meth)acrylamide, N-diethyl aminopropyl (meth)acrylamide, and the like), various dialkyl aminoalkyl (meth)acrylates (for example, dimethyl aminoethyl (meth)acrylate, diethyl aminoethyl (meth)acrylate, and the like), various monomers containing an amino group (for example, tert-butyl aminoethyl (meth)acrylate, tert-butyl aminopropyl (meth)acrylate, aziridinyl ethyl (meth)acrylate, pyrrolidinyl ethyl (meth)acrylate, piperidinyl ethyl (meth)acrylate, and the like), and the like are included.

It is preferable that the thermosetting (meth)acrylic resin be an acrylic resin having number average molecular weight from 1000 to 20000 (preferably, from 1500 to 15000).

When the number average molecular weight is within the range described above, smoothness and a mechanical property of the coating film are easily improved.

The number average molecular weight of the thermosetting (meth)acrylic resin is measured by a gel permeation chromatography (GPC). The measurement of the molecular weight by the GPC is performed in a THF solvent using GPC and HLC-8120GPC manufactured by Tosoh Corporation as a measuring device and TSK gel Super HM-M (15 cm) manufactured by Tosoh Corporation as a column. Weight average molecular weight and the number average molecular weight are calculated by using a molecular weight correction curve prepared by a standard sample of monodispersed polystyrene from a measurement result.

Thermosetting Polyester Resin

The thermosetting polyester resin, for example, is a polycondensation material in which at least a polybasic acid and polyol are polycondensed. A curable reactive group is introduced into the thermosetting polyester resin by adjusting a used amount of the polybasic acid and the polyol. According to this adjustment, a thermosetting polyester resin having at least one of a carboxyl group and a hydroxyl group as the curable reactive group is obtained.

As the polybasic acid, for example, a terephthalic acid, an isophthalic acid, a phthalic acid, a methyl terephthalic acid, a trimellitic acid, a pyromellitic acid, and anhydride thereof; a succinic acid, an adipic acid, an azelaic acid, a sebacic acid, and anhydride thereof; maleic acid, an itaconic acid, and anhydride thereof; a fumaric acid, a tetrahydrophthalic acid, a methyl tetrahydrophthalic acid, a hexahydrophthalic acid, a methyl hexahydrophthalic acid, and anhydride thereof; a cyclohexane dicarboxylic acid, a 2,6-naphthalene dicarboxylic acid, and the like are included.

As the polyol, for example, ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-hydroxy ethyl terephthalate, cyclohexane dimethanol, octanediol, diethyl propanediol, butyl ethyl propanediol, 2-methyl-1,3-propanediol, 2,2,4-trimethyl pentanediol, hydrogenated bisphenol A, an ethyleneoxide adduct of hydrogenated bisphenol A, a propyleneoxide adduct of hydrogenated bisphenol A, trimethylolethane, trimethylolpropane, glycerin, pentaerythritol, trihydroxy ethyl isocyanurate, hydroxypivalyl hydroxypivalate, and the like are included.

For the thermosetting polyester resin, other monomers besides the polybasic acid and the polyol may be polycondensed.

As the other monomer, for example, a compound including both a carboxyl group and a hydroxyl group in one molecule (for example, a dimethanol propionic acid, hydroxy pivalate, and the like), a monoepoxy compound (for example, glycidyl ester of a branched aliphatic carboxylic acid such as "Cardura E10 (manufactured by Shell Japan Ltd.)") and the like), various monovalent alcohols (for example, methanol, propanol, butanol, benzyl alcohol, and the like), various monovalent basic acids (for example, a benzoic acid, a p-tert-butyl benzoic acid, and the like), various fatty acids (for example, a castor oil fatty acid, a coconut oil fatty acid, a soybean oil fatty acid, and the like), and the like are included.

A structure of the thermosetting polyester resin may be a branched structure, or may be a linear structure.

A sum total of an acid value and a hydroxyl value of the thermosetting polyester resin is from 10 mg KOH/g to 250 mg KOH/g, and a polyester resin having number average molecular weight from 1000 to 100000.

When the sum total of the acid value and the hydroxyl value is within the range described above, smoothness and a mechanical property of the coating film are easily improved. When the number average molecular weight is within the range described above, smoothness and a mechanical property of the coating film is improved, and storage stability of the powder coating material is also easily improved.

Furthermore, the measurement of the acid value and the hydroxyl value of the thermosetting polyester resin is based on JIS K-0070-1992. In addition, the measurement of the number average molecular weight of the thermosetting polyester resin is identical to the measurement of the number average molecular weight of the thermosetting (meth)acrylic resin.

The thermosetting resins may be independently used, or two or more of them may be used in combination.

A content of the thermosetting resin is preferably from 20% by weight to 99% by weight with respect to all the powder particles, and is more preferably from 30% by weight to 95% by weight.

Furthermore, when the thermosetting resin is applied as a resin of the resin covering portion, the content of the thermosetting resin indicates a content of the entire thermosetting resin of the core and the resin covering portion.

Thermosetting Agent

The thermosetting agent is selected according to a type of the curable reactive group of the thermosetting resin.

Specifically, when the curable reactive group of the thermosetting resin is an epoxy group, as a thermosetting agent, for example, an acid such as a succinic acid, a glutaric acid, an adipic acid, a pimelic acid, a suberic acid, an azelaic acid, a sebacic acid, a dodecanedioic acid, an eicosanedioic acid, a maleic acid, a citraconic acid, an itaconic acid, a glutaconic acid, a phthalic acid, a trimellitic acid, a pyromellitic acid, a tetrahydrophthalic acid, a hexahydrophthalic acid, a cyclohexane-1,2-dicarboxylic acid, a trimellitic acid, and a pyromellitic acid; anhydride of these acids; and an urethane modified material of these acids, and the like are included. Among them, as the thermosetting agent, an aliphatic dibasic acid is preferable in terms of a physical property of the coating film and storage stability, and a dodecanedioic acid is especially preferable in terms of a physical property of the coating film.

When the curable reactive group of the thermosetting resin is a carboxyl group, as the thermosetting agent, for example, various epoxy resins (for example, polyglycidyl ether of bisphenol A, and the like), an acrylic resin containing an epoxy group (for example, an acrylic resin containing a glycidyl group, and the like), various polyglycidyl ethers of polyol (for example, 1,6-hexanediol, trimethylolpropane, trimethylolethane, and the like), various polyglycidyl esters of polyvalent carboxylic acid (for example, a phthalic acid, a terephthalic acid, an isophthalic acid, a hexahydrophthalic acid, a methyl hexahydrophthalic acid, a trimellitic acid, a pyromellitic acid, and the like), various compounds containing an alicyclic epoxy group (for example, bis(3,4-epoxy cyclohexyl)methyl adipate, and the like), hydroxy amide (for example, triglycidyl isocyanurate, β-hydroxy alkyl amide, and the like), and the like are included.

When the curable reactive group of the thermosetting resin is a hydroxyl group, as the thermosetting agent, for example, a blocked polyisocyanate, an aminoplast, and the like are included. As the blocked polyisocyanate, for example, organic diisocyanate such as various aliphatic diisocyanates (for example, hexamethylene diisocyanate, trimethyl hexamethylene diisocyanate, and the like), various cyclic aliphatic diisocyanates (for example, xylylene diisocyanate, isophorone diisocyanate, and the like), various aromatic diisocyanates (for example, tolylene diisocyanate, 4,4'-diphenyl methane diisocyanate, and the like); an adduct of these organic diisocyanates with polyol, a low molecular weight polyester resin (for example, polyester polyol), water, or the like; a polymer of these organic diisocyanates (a polymer including an isocyanurate-type polyisocyanate compound); a material in which various polyisocyanate compounds such as an isocyanate and biuret material are blocked by a common blocking agent; a self blocked polyisocyanate compound having an uretdione bond as a structure unit, and the like are included.

The thermosetting agents may be independently used, or two or more of them may be used in combination.

The content of the thermosetting agent is preferably from 1% by weight to 30% by weight with respect to the thermosetting resin, and is more preferably from 3% by weight to 20% by weight.

Furthermore, when the thermosetting resin is applied as a resin of the resin covering portion, the content of the thermosetting agent indicates a content of the core and the resin covering portion with respect to the entire thermosetting resin.

Coloring Agent

As the coloring agent, for example, a pigment is included. As the coloring agent, a dye may be used together with a pigment.

As the pigment, for example, an inorganic pigment such as iron oxide (for example, colcothar, and the like), titanium oxide, titanium yellow, zinc white, lead white, zinc sulfide, lithopone, antimony oxide, cobalt blue, and carbon black; an organic pigment such as quinacridone red, phthalocyanine blue, phthalocyanine green, permanent red, hansa yellow, indanthrene blue, brilliant fast scarlet, and benzimidazolone yellow, and the like are included.

In addition, as the pigment, a brilliant pigment is also included. As the brilliant pigment, for example, a peal pigment, a metallic powder such as an aluminum powder, and a stainless steel powder; a metallic flake; glass beads; a glass flake; mica; scaly iron oxide (MIO), and the like are included.

The coloring agents may be independently used, or two or more of them may be used in combination.

A content of the coloring agent is selected according to a type of the pigment, and a hue, brightness, a depth, and the like required for the coating film. For example, the content of the coloring agent is preferably from 1% by weight to 70% by weight with respect to the entire resin of the core and the resin covering portion, and is more preferably from 2% by weight to 60% by weight.

Other Additives

As the other additive, various additives used for the powder coating material are included. Specifically, as the other additive, for example, a surface conditioner (silicone oil, acrylic oligomer, and the like), a foam (popping) inhibitor (for example, benzoin, a benzoin derivative, and the like), a curing accelerator (an amine compound, an imidazole compound, a cationic polymerization catalyst, and the like), a plasticizer, a charging-controlling agent, an antioxidant, a pigment dispersant, a flame retardant, a fluidity imparting agent, and the like are included.

Resin Covering Portion

The resin covering portion includes a resin. The resin covering portion may be configured only of a resin, or may include other additives (the thermosetting agent, the other additive, and the like described in the core). Here, the resin covering portion may be configured only of a resin in terms of further reducing bleed of the powder particles. Furthermore, when the resin covering portion includes the additive, a content of the resin may be greater than or equal to 90% by weight (preferably, greater than or equal to 95% by weight) with respect to the entire resin covering portion.

The resin of the resin covering portion may be a non-curable resin, or may be a thermosetting resin. Here, the resin of the resin covering portion may be a thermosetting resin in terms of improving curing density (cross-linking density) of the coating film. When a thermosetting resin is applied as the resin of the resin covering portion, as the thermosetting resin, the same thermosetting resins as that of the core are included. In particular, when the thermosetting resin is applied as the resin of the resin covering portion, it is preferable that the thermosetting resin be at least one selected from the group consisting of a thermosetting (meth) acrylic resin and a thermosetting polyester resin. Here, the thermosetting resin of the resin covering portion may be the same thermosetting resins as that of the core, or may be thermosetting resins different from that of the core.

Furthermore, when a non-curable resin is applied as the resin of the resin covering portion, as the non-curable resin, at least one selected from the group consisting of an acrylic resin and a polyester resin is preferably included.

A coverage of the resin covering portion is preferably from 30% to 100%, and is more preferably from 50% to 100% in terms of preventing bleed.

The coverage of the resin covering portion is a value obtained by measuring the coverage of the resin covering portion in the surfaces of the powder particles using XPS (X-ray photoemission spectroscopy) measurement.

Specifically, the XPS measurement is performed by using JPS-9000MX manufactured by JEOL Ltd. as a measuring device and an MgKα-ray as an X-ray source, and by setting an acceleration voltage to 10 kV and an emission current to 30 mA.

A component due to a material of the core in the surfaces of the powder particles and a component due to a material of the resin covering portion are subjected to peak separation from a spectrum obtained in the condition described above, and thus the coverage of the resin covering portion in the surfaces of the powder particles is determined. The peak separation separates the measured spectrum into each component by curve fitting using a least square method.

As a component spectrum which is a base of the separation, a spectrum obtained by independently measuring a thermosetting resin, a curing agent, a pigment, an additive, a resin for covering which are used for preparing the powder particles is used. Then, the coverage is obtained from a proportion of spectrum intensity due to a resin for covering with respect to a summation of entire spectrum intensity obtained by the powder particles.

A thickness of the resin covering portion is preferably from 0.2 μm to 4 μm in terms of preventing bleed, and is more preferably from 0.3 μm to 3 μm.

The thickness of the resin covering portion is a value measured by the following method. The powder particles are embedded in an epoxy resin or the like, and are cut by a diamond knife or the like, and thus a thin slice is prepared. The thin slice is observed by a transmission electron microscope (TEM) or the like, and a cross-sectional image of plural powder particles is photographed. The thickness of the resin covering portion is measured at 20 portions from the cross-sectional image of the powder particles, and an average value thereof is adopted. When it is difficult to observe the resin covering portion in the cross-sectional image due to a clear powder coating material or the like, the resin covering portion is observed by being dyed, and thus it is possible to easily perform the measurement.

Other Components of Powder Particles

In the powder particles, bivalent or more metallic ions (hereinafter, simply referred to as a "metallic ion") may be included. The metallic ion is a component included in either of the core and the resin covering portion of the powder particles. When the bivalent or more metallic ion is included in the powder particles, an ion cross-linkage is formed by a metallic ion in the powder particles. For example, when a polyester resin is applied as the thermosetting resin of the core and the resin of the resin covering portion, a carboxyl group or a hydroxyl group of the polyester resin and the metallic ion are interacted, and the ion cross-linkage is formed. By this ion cross-linkage, the powder particles are prevented from being bled, and thus preservability easily increases. In addition, a bond of the ion cross-linkage is cut by heat at the time of performing thermal curing after the coating of the powder coating material, and thus melt viscosity of the powder particles decreases, whereby the coating film having high smoothness is easily formed.

As the metallic ion, for example, bivalent to tetravalent metallic ions are included. Specifically, as the metallic ion, for example, at least one metallic ion selected from the group consisting of aluminum ion, magnesium ion, iron ion, zinc ion, and calcium ion is included.

As a supply source of the metallic ion (a compound included in the powder particles as an additive), for example, a metallic salt, an inorganic metallic salt polymer, a metallic complex, and the like are included. When the powder particles are prepared by an aggregation and coalescence method, the metallic salt or the inorganic metallic salt polymer, for example, is added to the powder particles as an aggregating agent.

As the metallic salt, for example, aluminum sulfate, aluminum chloride, magnesium chloride, magnesium sulfate, iron chloride (II), zinc chloride, calcium chloride, calcium sulfate, and the like are included.

As the inorganic metallic salt polymer, for example, polyaluminum chloride, polyaluminum hydroxide, polyferric sulfate (II), calcium polysulfide, and the like are included.

As the metallic complex, for example, a metallic salt of an amino carboxylic acid, and the like are included. As the metallic complex, specifically, for example, a metallic salt (for example, a calcium salt, a magnesium salt, an iron salt, an aluminum salt, and the like) including a known chelate such as an ethylenediamine tetraacetic acid, a propanediamine tetraacetic acid, a nitriltriacetic acid, a triethylenetetramine hexaacetic acid, and a diethylenetriamine pentaacetic acid as a base, and the like are included.

Furthermore, the supply source of these metallic ions may be added merely as an additive, but not as an aggregating agent.

Anion cross-linkage having a network structure is easily formed as a valence of the metallic ion becomes higher, which is preferable in terms of smoothness of the coating film and preservability of the powder coating material. For this reason, as the metallic ion, Al ions are preferable. That is, as the supply source of the metallic ion, an aluminum salt (for example, aluminum sulfate, aluminum chloride, and the like), and an aluminum salt polymer (for example, polyaluminum chloride, polyaluminum hydroxide, and the like) are preferable. Further, the inorganic metallic salt polymer is preferable to the metallic salt even when the valences of the metallic ions in the supply source of the metallic ion are identical to each other in terms of smoothness of the coating film and preservability of the powder coating material. For this reason, as the supply source of the metallic ion, in particular, an aluminum salt polymer (for example, polyaluminum chloride, polyaluminum hydroxide, and the like) is preferable.

A content of the metallic ion is preferably from 0.002% by weight to 0.2% by weight with respect to all the powder particles, and is more preferably from 0.005% by weight to 0.15% by weight in terms of smoothness of the coating film and preservability of the powder coating material.

When the content of the metallic ion is greater than or equal to 0.002% by weight, a suitable ion cross-linkage due to the metallic ion is formed, and bleed of the powder particles is prevented, and thus preservability of the coating material easily increases. On the other hand, when the content of the metallic ion is less than or equal to 0.2% by weight, excessive ion cross-linkages due to the metallic ion are prevented from being formed, and thus smoothness of the coating film easily increases.

Here, when the powder particles are prepared by an aggregation and coalescence method, the supply source of the metallic ion added as an aggregating agent (a metallic salt, and a metallic salt polymer) contributes to control of the particle size distribution and the shape of the powder particles.

Specifically, a narrow particle size distribution is obtained as the valence of the metallic ion becomes higher, which is preferable. In addition, the metallic salt polymer is preferable to the metallic salt even when the valences of the metallic ions are identical to each other in terms of obtaining the narrow particle size distribution. For this reason, from this point, as the supply source of the metallic ion, an aluminum salt (for example, aluminum sulfate, aluminum chloride, and the like), and an aluminum salt polymer (for example, polyaluminum chloride, polyaluminum hydroxide, and the like) are preferable, and an aluminum salt polymer (for example, polyaluminum chloride, polyaluminum hydroxide, and the like) is especially preferable.

In addition, when the aggregating agent is added such that the content of the metallic ion is greater than or equal to 0.002% by weight, the resin particles are aggregated in an aqueous medium, and thus contribute to the narrow particle size distribution. In addition, the resin particles which become the resin covering portion are aggregated with respect to the aggregation particles which become the core, and thus contribute to the formation of the resin covering portion with respect to the entire surface of the core. In contrast, when the aggregating agent is added such that the content of the metallic ion is less than or equal to 0.2% by weight, the ion cross-linkage in the aggregation particles is prevented from being excessively formed, and a shape of the formed powder particles is easily close to a spherical shape at the time of performing coalescence. For this reason, from this point, the content of the metallic ion is preferably from 0.002% by weight to 0.2% by weight, and is more preferably from 0.005% by weight to 0.15% by weight.

The content of the metallic ion is measured by quantitatively analyzing fluorescent X-ray intensity of the powder particles. Specifically, for example, first, the resin and the supply source of the metallic ion are mixed, and a resin mixture of which concentration of the metallic ion has been already known is obtained. A pellet sample is obtained by 200 mg of this resin mixture using a troch forming machine having a diameter of 13 mm. Weight of the pellet sample is accurately weighed, and the pellet sample is subjected to fluorescent X-ray intensity measurement, and thus peak intensity is obtained. Similarly, the measurement is also performed with respect to pellet samples in which an added amount of the supply source of the metallic ion is changed, and a calibration curve is prepared from results thereof. Then, by using this calibration curve, the content of the metallic ion in the powder particles which are a measurement target is quantitatively analyzed.

As an adjustment method of the content of the metallic ion, for example, 1) a method of adjusting the added amount of the supply source of the metallic ion, 2) a method of adjusting the added amount of the metallic ion by adding an aggregating agent (for example, a metallic salt or a metallic salt polymer) as the supply source of the metallic ion in an aggregation step at the time of preparing the powder particles by an aggregation and coalescence method, then by adding a chelating agent (for example, an ethylene diamine tetraacetic acid (EDTA), a diethylene triamine pentaacetic acid (DTPA), a nitrilotriacetic acid (NTA), and the like) at the end of the aggregation step to thereby form a complex with the metallic ion by the chelating agent, and by removing a complex salt formed in a subsequent washing step or the like, and the like are included.

External Additive

The aggregation between the powder particles is prevented by an external additive, and thus it is possible to form the coating film having high smoothness in small amount. As a specific example of the external additive, for example, inorganic particles are included. As the inorganic particles, particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)n$, $Al_2O_3.2SiO_2$, $CaCO_3$, $MgCO_3$, $BaSO_4$, $MgSO_4$, and the like are included.

The surfaces of the inorganic particles as the external additive may be subjected to a hydrophobization treatment. The hydrophobization treatment, for example, is performed by dipping the inorganic particles in a hydrophobizing agent, and the like. The hydrophobizing agent is not particularly limited, and for example, a silane coupling agent, silicone oil, a titanate coupling agent, an aluminum coupling agent, and the like are included. These hydrophobizing agents may be independently used, or two or more of them may be used in combination.

In general, an amount of the hydrophobizing agent, for example, is from 1 part by weight to 10 parts by weight with respect to 100 parts by weight of the inorganic particles.

An externally added amount of the external additive, for example, is preferably from 0.01% by weight to 5% by weight with respect to the powder particles, and is more preferably from 0.01% by weight to 2.0% by weight.

Manufacturing Method of Powder Coating Material

Next, a manufacturing method of the powder coating material according to this exemplary embodiment will be described.

The powder coating material according to this exemplary embodiment is obtained by manufacturing the powder particles, and then by externally adding the external additive to the powder particles, as necessary.

The powder particles may be manufactured by any one of a dry manufacturing method (for example, a kneading and pulverizing method, and the like), and a wet manufacturing method (for example, an aggregation and coalescence method, a suspension polymerization method, a dissolution suspension method, and the like). The manufacturing method of the powder particles is not particularly limited to these manufacturing methods, and a known manufacturing method is adopted.

Among them, the powder particles may be obtained by an aggregation and coalescence method in terms of enabling the volume particle size distribution index GSDv and the average circularity to be easily controlled to the range described above.

Specifically, it is preferable that the powder particles be manufactured through a step of forming first aggregation particles by aggregating the first resin particles including a thermosetting resin and a thermosetting agent in a dispersion in which the first resin particles and the thermosetting agent are dispersed, or by aggregating composite particles including a thermosetting resin and a thermosetting agent in a dispersion in which the composite particles are dispersed, a step of forming second aggregation particles by mixing a first aggregation particle dispersion in which the first aggregation particles are dispersed and a second resin particle dispersion in which the second resin particles including a resin are dispersed, to aggregate the second resin particles with surfaces of the first aggregation particles, whereby the second resin particles are attached to the surface of the first aggregation particles to thereby form the second aggregation particles, and a step of coalescing the second aggregation particles by heating the second aggregation particle dispersion in which the second aggregation particles are dispersed.

Furthermore, in the powder particles manufactured by this aggregation and coalescence method, a portion in which the first aggregation particles are coalesced is the core, and a portion in which the second resin particles attached to the surfaces of the first aggregation particles are coalesced is the resin covering portion.

Hereinafter, each step will be described in detail.

Furthermore, in the following description, a manufacturing method of the powder particles including a coloring agent will be described, but the coloring agent is contained as necessary.

Each Dispersion Preparing Step

First, each dispersion used in the aggregation and coalescence method is prepared. Specifically, a first resin particle dispersion in which first resin particles including a thermosetting resin of the core are dispersed, a thermosetting agent dispersion in which a thermosetting agent is dispersed, a coloring agent dispersion in which a coloring agent is dispersed, and a second resin particle dispersion in which second resin particles including a resin of the resin covering portion are dispersed are prepared.

In addition, a composite particle dispersion in which the thermosetting resin of the core and composite particles including a thermosetting agent are dispersed is prepared instead of the thermosetting agent dispersion in which the first resin particle dispersion and the thermosetting agent are dispersed.

Furthermore, in the each dispersion preparing step, the first resin particles, the second resin particles, and the composite particles are described as "resin particles".

Here, the resin particle dispersion, for example, is prepared by dispersing the resin particles in a dispersion medium by a surfactant.

As the dispersion medium used in the resin particle dispersion, for example, an aqueous medium is included.

As the aqueous medium, for example, water such as distilled water and ion exchange water; alcohols, and the like are included. These aqueous mediums may be independently used, or two or more of them may be used in combination.

As the surfactant, for example, an anionic surfactant such as sulfate ester salts, sulfonate salts, phosphate esters, and soaps; a cationic surfactant such as amine salts, and quaternary ammonium salts; a nonionic surfactant such as polyethylene glycols, alkylphenol ethylene oxide adducts, and polyols, and the like are included. Among them, in particular, an anionic surfactant, and a cationic surfactant are included. The nonionic surfactant may be used together with an anionic surfactant or a cationic surfactant.

These surfactants may be independently used, or two or more of them may be used in combination.

In the resin particle dispersion, as a method of dispersing the resin particles in the dispersion medium, for example, a general dispersion method such as a rotary shearing homogenizer, or a ball mill, a sand mill, and a dyne mill including media is included. In addition, for example, the resin particles may be dispersed in the resin particle dispersion by using a phase inversion emulsification method according to a type of the resin particles.

Furthermore, the phase inversion emulsification method is a method in which a resin to be dispersed is dissolved in a hydrophobic organic solvent in which the resin is soluble, a base is added to an organic continuous phase (an O phase) to neutralize the phase, then an aqueous medium (a W phase) is put, and the resin is converted from W/O to O/W (a so-called phase inversion) and becomes a discontinuous phase, and thus the resin is dispersed in the aqueous medium in the shape of a particle.

Specifically, in a manufacturing method of the resin particle dispersion, for example, when an acrylic resin particle dispersion is manufactured, a raw material monomer is emulsified in aqueous medium under water, a water soluble initiator, and as necessary, a chain transfer agent are added and heated for controlling molecular weight, and are subjected to an emulsification polymerization, and thus a resin particle dispersion in which acrylic resin particles are dispersed is obtained.

In addition, when a polyester resin particle dispersion is manufactured, a raw material monomer is heated and melted, and is subjected to a polycondensation under reduced pressure, then the obtained polycondensation material is added to a solvent (for example, ethyl acetate, and the like) and is dissolved, an alkalescent aqueous solution is further added to the obtained dissolved material while being stirred, and is subjected to a phase inversion emulsification, and thus a resin particle dispersion in which polyester resin particles are dispersed is obtained.

Furthermore, when the composite particle dispersion is obtained, the resin and the thermosetting agent are mixed, and are dispersed in the dispersion medium (for example, an emulsification such as a phase inversion emulsification), and thus the composite particle dispersion is obtained.

A volume average particle diameter of the resin particles dispersed in the resin particle dispersion, for example, may be less than or equal to 1 μm, is preferable from 0.01 μm to 1 μm, is more preferable from 0.08 μm to 0.8 μm, and is further preferable from 0.1 μm to 0.6 μm.

Furthermore, the volume average particle diameter of the resin particles is measured by taking a cumulation distribution from a small particle diameter side with respect to volume in a divided particle size range (a channel) using a particle size distribution obtained by measurement of a laser diffraction type particle size distribution measuring device (for example, LA-700 manufactured by Horiba, Ltd.), and by setting a particle diameter having a cumulation of 50% with respect to all the particles as a volume average particle diameter D50v. Furthermore, a volume average particle diameter of the particles in other dispersions is similarly measured.

A content of the resin particles included in the resin particle dispersion, for example, is preferable from 5% by weight to 50% by weight, and is more preferably from 10% by weight to 40% by weight.

Furthermore, similar to the resin particle dispersion, for example, the thermosetting agent dispersion, the coloring agent dispersion, and the composite particle dispersion are prepared. That is, the volume average particle diameter of the resin particles in the resin particle dispersion, the dispersion medium, the dispersion method, and the content of the particles are similarly applied to particles of a coloring agent dispersed in the coloring agent dispersion, particles of a curing agent dispersed in the curing agent dispersion, and the composite particles dispersed in the composite particle dispersion.

First Aggregation Particle Forming Step

Next, the first resin particle dispersion, the thermosetting agent dispersion, and the coloring agent dispersion are mixed.

Then, in the mixed dispersion, the first resin particles, the thermosetting agent, and the coloring agent are heteroaggregated, and thus the first aggregation particles having a diameter close to a target diameter of the powder particles and including the first resin particles, the thermosetting agent, and the coloring agent are formed.

Specifically, for example, an aggregating agent is added to the mixed dispersion, and pH of the mixed dispersion is adjusted to be acidic (for example, the pH is from 2 to 5), a dispersion stabilization agent is added as necessary, then the mixed dispersion is heated to a glass transition temperature (specifically, for example, from the glass transition temperature of the first resin particles −30° C. to the glass transition temperature −10° C.) of the first resin particles, whereby the particles dispersed in the mixed dispersion are aggregated, and thus the first aggregation particles are formed.

Furthermore, in the first aggregation particle forming step, the composite particle dispersion including the thermosetting resin and the thermosetting agent, and the coloring agent dispersion may be mixed, and the composite particles and the coloring agent may be heteroaggregated in the mixed dispersion, and thus the first aggregation particles may be formed.

In the first aggregation particle forming step, for example, aggregating agent may be added at room temperature (for example, 25° C.) while the mixed dispersion is stirred by a rotary shearing homogenizer, the pH of the mixed dispersion may be adjusted to be acidic (for example, the pH is from 2 to 5), and the dispersion stabilization agent may be added as necessary, and then the mixed dispersion may be heated.

As the aggregating agent, for example, a surfactant, a metallic salt, a metallic salt polymer, and a metallic complex, which have a polarity opposite to that of the surfactant used as a dispersant which is added in the mixed dispersion, are included. When the metallic complex is used as the aggregating agent, a used amount of the surfactant is reduced, and a charging property is improved.

Furthermore, after finishing the aggregation, an additive forming a complex or a similar bond with the metallic ion of the aggregating agent may be used as necessary. As the additive, a chelating agent is preferably used. By adding the chelating agent, when the aggregating agent is excessively added, the content of the metallic ion of the powder particles is adjusted.

Here, the metallic salt, the metallic salt polymer, and the metallic complex as the aggregating agent are used as the supply source of the metallic ion. An example thereof is the same as described above.

As the chelating agent, a water soluble chelating agent is included. Specifically, as the chelating agent, for example, an oxycarboxylic acid such as a tartaric acid, a citric acid, and a gluconic acid, an iminodiacetic acid (IDA), a nitrilotriacetic acid (NTA), an ethylene diamine tetraacetic acid (EDTA), and the like are included.

An added amount of the chelating agent, for example, may be from 0.01 parts by weight to 5.0 parts by weight with respect to 100 parts by weight of the resin particles, and is preferably from 0.1 parts by weight to 3.0 parts by weight.

Second Aggregation Particle Forming Step

Next, the obtained first aggregation particle dispersion in which the first aggregation particles are dispersed, and the second resin particle dispersion are mixed.

Furthermore, the second resin particles may be identical to the first resin particles, or may be different from the first resin particles.

Then, the second resin particles are aggregated such that the second resin particles are attached to the surfaces of the first aggregation particles in the mixed dispersion in which the first aggregation particles and the second resin particles are dispersed, and the second aggregation particles attached to the surfaces of the first aggregation particles are formed.

Specifically, for example, in the first aggregation particle forming step, when a particle diameter of the first aggregation particles reaches a target particle diameter, the second resin particle dispersion is mixed into the first aggregation particle dispersion, and the mixed dispersion is heated at a temperature less than or equal to a glass transition temperature of the second resin particles.

Then, the pH of the mixed dispersion, for example, is set to be in a range from approximately 6.5 to 8.5, and thus the progression of the aggregation is stopped.

Accordingly, the second aggregation particles which are aggregated such that the second aggregation particles are attached to the surfaces of the first aggregation particles are obtained.

Coalescence Step

Next, the second aggregation particle dispersion in which the second aggregation particles are dispersed, for example, is heated at a temperature greater than or equal to the glass transition temperature of the first and the second resin particles (for example, a temperature 10° C. to 30° C. higher than or equal to the glass transition temperature of the first and the second resin particles), and the second aggregation particles are coalesced, and thus the powder particles are formed.

Through the above-described steps, the powder particles are obtained.

Here, after finishing the coalescence step, the powder particles formed in the dispersion are subjected through a known washing step, a solid-liquid separation step, and a drying step, and thus the powder particles in a dry state are obtained.

As the washing step, displacement washing by using ion exchange water may be sufficiently performed in terms of a charging property. In addition, the solid-liquid separation step is not particularly limited, but as the solid-liquid separation step, suction filtration, pressurization filtration, and the like may be performed in terms of productivity. In addition, the drying step is not particularly limited, but as the drying step, freeze drying, air flow type drying, flux drying, oscillation type flux drying, and the like may be performed in terms of productivity.

Then, the powder coating material according to this exemplary embodiment, as necessary, for example, is manufactured by adding and mixing an external additive into the obtained powder particles in a dry state. The mixing, for example, may be performed by a V blender, a Henschel mixer, a Lady gain mixer, and the like. Further, as necessary, coarse particles of the toner may be eliminated by using an oscillation sieve, a wind power sieve, and the like.

Hereinafter, Test Examples supporting the effects of the powder coating material according to this exemplary embodiment will be described. The powder coating material according to this exemplary embodiment is not limited to these Test Examples. Furthermore, in the following description, unless otherwise noted, "part" and "%" are on the basis of weight.

Preparation of Coloring Agent Dispersion

Preparation of Coloring Agent Dispersion (C1)

Cyan pigment (C.I. Pigment Blue 15:3 (copper phthalocyanine): manufactured by Dainichiseika Color & Chemicals Mfg. Co., Ltd.): 100 parts by weight Anionic surfactant (Neogen RK: manufactured by Dai-Ichi Kogyo Seiyaku Co., Ltd.): 15 parts by weight Ion exchange water: 450 parts by weight The components described above are mixed and dissolved, and are dispersed for 1 hour by using a high pressure impact type disperser Ultimizer (HJP30006, manufactured by Sugino Machine Limited), and thus a coloring agent dispersion in which a cyan pigment is dispersed is prepared. A volume average particle diameter of the cyan pigment in the coloring agent dispersion is 0.13 µm, and a solid content percentage of the coloring agent dispersion is 25%.

Preparation of Coloring Agent Dispersion (M1)

A coloring agent dispersion (M1) is prepared in the same method as that in the coloring agent dispersion (C1) except that the cyan pigment is changed to a magenta pigment (Chromo Fine Magenta 6887: a quinacridone pigment: manufactured by Dainichiseika Color & Chemicals Mfg. Co., Ltd.). A volume average particle diameter of the magenta pigment in the coloring agent dispersion is 0.14 µm, and a solid content percentage of the coloring agent dispersion is 25%.

Preparation of Coloring Agent Dispersion (M2)

A coloring agent dispersion (M2) is prepared by the same method as that in the coloring agent dispersion (C1) except that the cyan pigment is changed to a magenta pigment (Fastogen Super Red 7100Y-E: manufactured by DIC Corporation). A volume average particle diameter of the magenta pigment in the coloring agent dispersion is 0.14 µm, and a solid content percentage of the coloring agent dispersion is 25%.

Preparation of Coloring Agent Dispersion (Y1)

A coloring agent dispersion (Y1) is prepared by the same method as that in the coloring agent dispersion (C1) except that the cyan pigment is changed to a yellow pigment (Paliotol Yellow d1155: manufactured by BASF Ltd.). A volume average particle diameter of the yellow pigment in the coloring agent dispersion is 0.13 µm, and a solid content percentage of the coloring agent dispersion is 25%.

Preparation of Coloring Agent Dispersion (K1)

A coloring agent dispersion (K1) is prepared by the same method as that in the coloring agent dispersion (C1) except that the cyan pigment is changed to a black pigment (Reagal330: manufactured by Cabot Corporation). A volume average particle diameter of the black pigment in the coloring agent dispersion is 0.11 µm, and a solid content percentage of the coloring agent dispersion is 25%.

Preparation of Coloring Agent Dispersion (W1)

Titanium oxide (A-220: manufactured by Ishihara Sangyo Kaisha, Ltd.): 100 parts by weight Anionic surfactant (Neogen RK: manufactured by Dai-Ichi Kogyo Seiyaku Co., Ltd.): 15 parts by weight Ion exchange water: 400 parts by weight The components described above are mixed and dissolved, and are dispersed for 3 hours by using a high pressure impact type disperser Ultimizer (HJP30006: manufactured by Sugino Machine Limited), and thus a coloring agent dispersion in which titanium oxide is dispersed is prepared. The prepared coloring agent dispersion is measured by using a laser diffraction particle size measuring device, and thus a volume average particle diameter of the titanium oxide in the coloring agent dispersion is 0.25 µm, and a solid content percentage of the coloring agent dispersion is 25%.

Test Example 1: Clear Powder Coating Material of Acrylic Resin (PCA1)

Preparation of Thermosetting Acrylic Resin Particle Dispersion (A1)

Styrene: 160 parts by weight
Methyl methacrylate: 200 parts by weight
n-Butyl acrylate: 140 parts by weight
Acrylic acid: 12 parts by weight
Glycidyl methacrylate: 100 parts by weight
Dodecanethiol: 12 parts by weight A monomer solution A in which the components described above are mixed and dissolved is prepared.

On the other hand, 12 parts by weight of an anionic surfactant (Dowfax, manufactured by The Dow Chemical Company) is dissolved in 280 parts by weight of ion exchange water, and the monomer solution A described above is added thereto and, is dispersed and emulsified in a flask to thereby obtain a solution (a monomer emulsified liquid A).

Next, 1 part by weight of an anionic surfactant (Dowfax, manufactured by The Dow Chemical Company) is dissolved in 555 parts by weight of ion exchange water, and is put into a flask for a polymerization. After that, the flask for a polymerization is tightly capped, a reflux pipe is disposed, the dissolved material is slowly stirred while being injected with nitrogen, and the flask for a polymerization is heated up to 75° C. in a water bath and then is maintained.

In this state, a solution in which 9 parts by weight of ammonium persulfate is dissolved in 43 parts by weight of ion exchange water is dropped for 20 minutes in the flask for a polymerization through a metering pump, and the monomer emulsified liquid A is further dropped for 200 minutes through the metering pump. After finishing the dropping, the flask for a polymerization is maintained at 75° C. for 3 hours while the mixture is continuously stirred, and the polymerization is finished, and then an anionic thermosetting acrylic resin particle dispersion (A1) having a solid content amount of 42% is obtained.

Thermosetting acrylic resin particles included in the anionic thermosetting acrylic resin particle dispersion (A1) have a volume average particle diameter of 220 nm, a glass transition temperature of 55° C., and weight average molecular weight of 24000.

Preparation of Thermosetting Agent Dispersion (D1)

Dodecanedioic acid: 50 parts by weight
Benzoin: 1 part by weight
Acrylic oligomer (Acronal 4F, manufactured by BASF Ltd.): 1 part by weight Anionic surfactant (Dowfax, manufactured by The Dow Chemical Company): 5 parts by weight Ion exchange water: 200 parts by weight The components described above are heated at 140° C. in a pressure container, and are dispersed by using a homogenizer (Ultra-Turrax T50: manufactured by IRA Japan K.K.), then are subjected to a dispersion treatment by a Manton Gaulin high pressure homogenizer (manufactured by Gaulin Company), and thus a thermosetting agent dispersion (D1) (curing agent concentration: 23%) in which a curing agent having an average particle diameter of 0.24 μm and other additives are dispersed is prepared.

Preparation of Clear Powder Coating Material (PCA1)

Aggregation Step

Thermosetting acrylic resin particle dispersion (A1): 200 parts by weight (84 parts by weight of a resin)

Thermosetting agent dispersion (D1): 91 parts by weight (21 parts by weight of a curing agent)

10% polyaluminum chloride: 1 part by weight

The components described above are sufficiently mixed and dispersed in a stainless steel round flask by a homogenizer (Ultra-Turrax T50, manufactured by IKA Japan K.K.), then the flask is heated at 48° C. while the mixture is stirred in an oil bath for heating, and is maintained at 48° C. for 60 minutes, then 68 parts by weight of the thermosetting acrylic resin particle dispersion (A1) (28.56 parts by weight of a resin) is added and gently stirred.

Coalescence Step

After that, pH in the flask is adjusted to be 5.0 by 0.5 mol/liter of an aqueous sodium hydroxide solution, and then the flask is heated up to 95° C. while the mixture is continuously stirred. After finishing the heating of an inside of the flask up to 95° C., this state is continuously maintained for 4 hours. The pH at the time of maintaining the temperature at 95° C. is approximately 4.0.

Filtration, Washing, and Drying Step

After finishing the reaction, the solution in the flask is cooled and filtered, and thus a solid content is obtained. Next, this solid content is sufficiently washed by ion exchange water, and then is subjected to solid-liquid separation by Nutsche type suction filtration, and thus a solid content is obtained again.

Next, the solid content is re-dispersed in 3 liters of ion exchange water at 40° C., and is stirred and washed at 300 rpm for 15 minutes. A solid content which is obtained by repeating this washing operation five times and by being subjected to solid-liquid separation by Nutsche type suction filtration is dried for 12 hours in vacuum, then 0.5 parts by weight of hydrophobic silica particles (a primary particle diameter of 16 nm) are mixed as an external additive with respect to 100 parts by weight of the solid content, and thus a clear powder coating material of an acrylic resin (PCA1) is obtained.

Powder particles of the clear powder coating material have a volume average particle diameter D50v of 5.9 μm, a volume average particle size distribution index GSDv of 1.20, and average circularity of 0.99.

The clear powder coating material (the powder particles thereof) is embedded in an epoxy resin, then is cut to obtain a slice, and a cross-sectional image of the particles on the slice is observed by a transmission electron microscope, and thus it is confirmed that surfaces of the powder particles are covered with a resin covering portion.

In addition, a content of aluminum ions in the powder particles of the clear powder coating material is 0.08% by weight.

Test Example 2: Colored Powder Coating Material of Polyester Resin (PCE1)

Preparation of Thermosetting Polyester Resin (PES1)

A raw material of the following composition is put into a reaction container provided with a stirrer, a temperature gauge, a nitrogen gas introducing port, and a rectifier in a nitrogen atmosphere, and is heated up to 240° C. while being stirred, and thus a polycondensation reaction is performed.

Terephthalic acid: 742 parts by weight (100 mol %)

Neopentyl glycol: 312 parts by weight (62 mol %)

Ethylene glycol: 59.4 parts by weight (20 mol %)

Glycerin: 90 parts by weight (18 mol %)

Di-n-butyl tin oxide: 0.5 parts by weight

The obtained thermosetting polyester resin has a glass transition temperature of 55° C., an acid value (Av) of 8 mg KOH/g, a hydroxyl value (OHv) of 70 mg KOH/g, weight average molecular weight of 26000, and number average molecular weight of 8000.

Preparation of Composite Particle Dispersion (E1)

A jacket attached reaction bath (BJ-30N: manufactured by Tokyo Rikakikai Co., Ltd.) of 3 liters provided with a condenser, a temperature gauge, a water dropping device, and an anchor blade is maintained at 40° C. in a hydronic thermostatic bath, a mixed solvent of 180 parts by weight of ethyl acetate and 80 parts by weight of isopropyl alcohol is put into the reaction bath, and then the following composition material is put into the mixed solvent.

Thermosetting polyester resin (PES1): 240 parts by weight

Blocked isocyanate curing agent VESTAGONB1530 (manufactured by EVONIK Industries): 60 parts by weight Benzoin: 3 parts by weight Acrylic oligomer (Acronal 4F, manufactured by BASF Ltd.): 3 parts by weight Next, after the above-described composition material is put into the mixed solvent, this mixture is stirred at 150 rpm by using a three-one motor and is dissolved, and thus an oil phase is obtained. A mixed liquid of 1 part by weight of an aqueous ammonia solution of 10% by weight and 47 parts by weight of an aqueous sodium hydroxide solution of 5% by weight is dropped in the oil phase being stirred for 5 minutes, and is mixed for 10 minutes, and then 900 parts by weight of ion exchange water is further dropped at a rate of 5 parts by weight per every minute, and the mixture is subjected to a phase inversion, and thus an emulsified liquid is obtained.

800 parts by weight of the obtained emulsified liquid and 700 parts by weight of ion exchange water are put into a 2-liter egg plant flask, and are set in an evaporator (manufactured by Tokyo Rikakikai Co., Ltd.) provided with a vacuum control unit through a trap ball. The egg plant flask is heated in a hot bath of 60° C. while being rotated, and is decompressed up to 7 kPa with careful attention to bumping, and thus the solvent is removed. When a solvent collected amount is 1100 parts by weight, the egg plant flask is returned to an ordinary pressure, and the egg plant flask is subjected to water cooling, and thus a dispersion is obtained. There is no solvent odor in the obtained dispersion. A volume average particle diameter of composite particles containing a thermosetting polyester resin and a thermosetting agent in this dispersion is 150 nm.

After that, 2% by weight of an anionic surfactant (Dowfax 2A1, manufactured by The Dow Chemical Company, an effective component amount of 45% by weight) is added and mixed into a resin content in the dispersion as an effective component, and ion exchange water is added, and thus the mixture is adjusted such that a solid content concentration is 20% by weight. Accordingly, a composite particle dispersion (E1) containing a polyester resin and a curing agent is obtained.

Preparation of Thermosetting Polyester Resin Particle Dispersion (E2)

A thermosetting polyester resin particle dispersion (E2) is obtained in the same condition as that of preparing the composite particle dispersion (E1) except that the thermosetting polyester resin (PES1) is 300 parts by weight, and a blocked isocyanate curing agent, benzoin, and an acrylic oligomer are not added.

Preparation of Colored Powder Coating Material (PCE1)

Aggregation Step

Composite particle dispersion (E1): 325 parts by weight (a solid content of 65 parts by weight)

Coloring agent dispersion (C1): 3 parts by weight (a solid content of 0.75 parts by weight)

Coloring agent dispersion (W1): 150 parts by weight (a solid content of 37.5 parts by weight)

The components described above are sufficiently mixed and dispersed in a stainless steel round flask by a homogenizer (Ultra-Turrax T50, manufactured by IKA Japan K.K.). Subsequently, pH is adjusted to be 2.5 by using a 1.0% aqueous nitric acid solution. 0.50 parts by weight of a 10% aqueous polyaluminum chloride solution is added thereto, and a dispersion operation is continuously performed by Ultra-Turrax.

A stirrer and a mantle heater are disposed, and slurry is heated up to 50° C. while the number of rotations of the stirrer is suitably adjusted such that the slurry is sufficiently stirred, and is maintained at 50° C. for 15 minutes, then when a volume average particle diameter is 5.5 µm. 100 parts by weight of the thermosetting polyester resin dispersion (E2) is slowly put into the slurry.

Coalescence Step

After maintaining the state after putting the thermosetting polyester resin dispersion (E2) into the slurry for 30 minutes, pH is set to be 6.0 by using a 5% aqueous sodium hydroxide solution. After that, the slurry is heated up to 85° C. and maintained for 2 hours. Substantially sphered particles are observed by an optical microscope.

Filtration, Washing, and Drying Step

After finishing the reaction, the solution in the flask is cooled, and a solid content is obtained by filtration. Next, this solid content is sufficiently washed by ion exchange water, and then is subjected to solid-liquid separation by Nutsche type suction filtration, and thus a solid content is obtained again.

Next, the solid content is re-dispersed in 3 liters of ion exchange water at 40° C., and is stirred and washed at 300 rpm for 15 minutes. A solid content which is obtained by repeating this washing operation five times and by being subjected to solid-liquid separation by Nutsche type suction filtration is dried for 12 hours in vacuum, then 0.5 parts by weight of hydrophobic silica particles (a primary particle diameter of 16 nm) are mixed as an external additive with respect to 100 parts by weight of the solid content, and thus a colored powder coating material of a polyester resin (PCE1) is obtained.

Powder particles of the colored powder coating material have a volume average particle diameter D50v of 6.5 µm, a volume average particle size distribution index GSDv of 1.24, and average circularity of 0.98.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

In addition, a content of aluminum ions in the colored powder coating material (the powder particles thereof) is 0.1% by weight.

Test Example 3: Colored Powder Coating Material of Polyester (PCE2)

A colored powder coating material of a polyester resin (PCE2) is obtained in the same condition as that in Test Example 2 except that 100 parts by weight of the thermosetting polyester resin particle dispersion (E2) is put into the slurry, and 40 parts by weight of a 10% aqueous nitrilotriacetic acid (NTA) metallic salt solution (Chelest 70: manufactured by Chelest Corporation) is added, and then pH is set to be 6.0 by using a 5% aqueous sodium hydroxide solution.

Powder particles of the colored powder coating material have a volume average particle diameter D50v of 6.8 µm, a volume average particle size distribution index GSDv of 1.22, and average circularity of 0.99.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

A content of aluminum ions in the colored powder coating material (the powder particles thereof) is 0.005% by weight.

Test Example 4: Clear Powder Coating Material of Acrylic Resin (PCA2)

A clear powder coating material of an acrylic resin (PCA2) is obtained in the same condition as that in Test Example 1 except that 1 part by weight of the 10% polyaluminum chloride is changed to 4 parts by weight of 5% chloride magnesium in the aggregation step.

Powder particles of the clear powder coating material have a volume average particle diameter D50v of 7.0 µm, a volume average particle size distribution index GSDv of 1.35, and average circularity of 0.97.

The clear powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

A content of aluminum ions in the colored powder coating material (the powder particles thereof) is 0.17% by weight.

Test Example 5: Colored Powder Coating Material of Acrylic Resin (PCA3)

Preparation of Thermosetting Acrylic Resin Particle Dispersion (A2)

Styrene: 60 parts by weight
Methyl methacrylate: 240 parts by weight
Hydroxy ethyl methacrylate: 50 parts by weight
Carboxyethyl acrylate: 18 parts by weight
Glycidyl methacrylate: 260 parts by weight
Dodecanethiol: 8 parts by weight A monomer solution A in which the components described above are mixed and dissolved is prepared.

On the other hand, 12 parts by weight of an anionic surfactant (Dowfax, manufactured by The Dow Chemical Company) is dissolved in 280 parts by weight of ion exchange water, and the monomer solution A is added thereto, and thus a solution (s monomer emulsified liquid A) which is dispersed and emulsified in a flask is obtained.

Next, 1 part by weight of an anionic surfactant (Dowfax, manufactured by The Dow Chemical Company) is dissolved in 555 parts by weight of ion exchange water, and is put into a flask for a polymerization. After that, tightly capped, a reflux pipe is disposed, the dissolved material is slowly stirred while being injected with nitrogen, and the flask for a polymerization is heated up to 75° C. in a water bath and then is maintained.

In this state, a solution in which 9 parts by weight of ammonium persulfate is dissolved in 43 parts by weight of ion exchange water is dropped for 20 minutes in the flask for a polymerization through a metering pump, and the monomer emulsified liquid A is further dropped over 200 minutes through the metering pump. After finishing the dropping, the flask for a polymerization is maintained at 75° C. for 3 hours while the mixture is continuously stirred, and the polymerization is finished, and then an anionic thermosetting acrylic resin particle dispersion (A2) having a solid content amount of 42% is obtained.

Thermosetting acrylic resin particles included in the anionic thermosetting acrylic resin particle dispersion (A2) have a volume average particle diameter of 200 nm, a glass transition temperature of 65° C., and weight average molecular weight of 31000.

Preparation of Colored Powder Coating Material (PCA3)
Aggregation Step
Thermosetting acrylic resin particle dispersion (A2): 155 parts by weight (a solid content of 65 parts by weight)
Coloring agent dispersion (C1): 3 parts by weight (a solid content of 0.75 parts by weight)
Coloring agent dispersion (W1): 150 parts by weight (a solid content of 37.5 parts by weight)

The components described above are sufficiently mixed and dispersed in a stainless steel round flask by a homogenizer (Ultra-Turrax T50, manufactured by TKA Japan K.K.). Subsequently, pH is adjusted to be 2.5 by using a 1.0% aqueous nitric acid solution. 0.70 parts by weight of a 10% aqueous polyaluminum chloride solution is added thereto, and a dispersion operation is continuously performed by Ultra-Turrax.

A stirrer and a mantle heater are disposed, and slurry is heated up to 60° C. while the number of rotations of the stirrer is suitably adjusted such that the slurry is sufficiently stirred, and is maintained at 60° C. for 15 minutes, then when a volume average particle diameter is 9.5 μm, 100 parts by weight of the thermosetting polyester resin dispersion (A2) is slowly put into the slurry.

Coalescence Step
After maintaining the state after putting the thermosetting polyester resin dispersion (A2) into the slurry for 30 minutes, pH is set to be 5.0 by using a 5% aqueous sodium hydroxide solution. After that, the slurry is heated up to 90° C. and maintained for 2 hours. Substantially sphered particles are observed by an optical microscope.

Filtration, Washing, and Drying Step
After finishing the reaction, the solution in the flask is cooled, and a solid content is obtained by filtration. Next, this solid content is sufficiently washed by ion exchange water, and then is subjected to solid-liquid separation by Nutsche type suction filtration, and thus a solid content is obtained again.

Next, the solid content is re-dispersed in 3 liters of ion exchange water at 40° C., and is stirred and washed at 300 rpm for 15 minutes. A solid content which is obtained by repeating this washing operation five times and by being subjected to solid-liquid separation by Nutsche type suction filtration is dried for 12 hours in vacuum, then 0.5 parts by weight of hydrophobic silica particles (a primary particle diameter of 16 nm) are mixed with respect to 100 parts by weight of the solid content, and thus a colored powder coating material of an acrylic resin (PCA3) is obtained.

Powder particles of the colored powder coating material have a volume average particle diameter D50v of 13.5 μm, a volume average particle size distribution index GSDv of 1.23, and average circularity of 0.98.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

In addition, a content of aluminum ions in the colored powder coating material (the powder particles thereof) is 0.03% by weight.

Test Example 6: Colored Powder Coating Material of Polyester Resin (PCE3)

Preparation of Thermosetting Polyester Resin (PES2)
A raw material of the following composition is put into a reaction container provided with a stirrer, a temperature gauge, a nitrogen gas-introducing port, and a rectifier in a nitrogen atmosphere, and is heated up to 240° C. while being stirred, and thus a polycondensation reaction is performed.
Terephthalic acid: 494 parts by weight (70 mol %)
Isophthalic acid: 212 parts by weight (30 mol %)
Neopentyl glycol: 421 parts by weight (88 mol %)
Ethylene glycol: 28 parts by weight (10 mol %)
Trimethylolethane: 11 parts by weight (2 mol %)
Di-n-butyl tin oxide: 0.5 parts by weight The obtained thermosetting polyester resin has a glass transition temperature of 60° C., an acid value (Av) of 7 mg KOH/g, a hydroxyl value (OHv) of 35 mg KOH/g, weight average molecular weight of 22000, and number average molecular weight of 7000.

Preparation of Composite Particle Dispersion (E3)
A jacket attached reaction bath (BJ-30N: manufactured by Tokyo Rikakikai Co., Ltd.) of 3 liters provided with a condenser, a temperature gauge, a water dropping device, and an anchor blade is maintained at 40° C. in a hydronic thermostatic bath, a mixed solvent of 180 parts by weight of ethyl acetate and 80 parts by weight of isopropyl alcohol is put into the reaction bath, and then the following composition material is put thereto.
Thermosetting polyester resin (PES2): 240 parts by weight
Blocked isocyanate curing agent VESTAGONB1530 (manufactured by EVONIK Industries): 60 parts by weight
Benzoin: 3 parts by weight
Acrylic oligomer (Acronal 4F, manufactured by BASF Ltd.): 3 parts by weight Next, after the above-described composition material is put into the mixed solvent, this mixture is stirred at 150 rpm by using a three-one motor and is dissolved, and thus an oil phase is obtained. A mixed liquid of 1 part by weight of a 10% ammonia aqueous solution and 47 parts by weight of a 5% aqueous sodium hydroxide solution is dropped in the oil phase being stirred for 5 minutes, and is mixed for 10 minutes, and then 900 parts by weight of ion exchange water is further dropped at a rate of 5 parts by weight per every minute, and the mixture is subjected to a phase inversion, and thus an emulsified liquid is obtained.

800 parts by weight of the obtained emulsified liquid and 700 parts by weight of ion exchange water are put into a 2-liter egg plant flask, and are set in an evaporator (manufactured by Tokyo Rikakikai Co., Ltd.) provided with a vacuum control unit through a trap ball. The egg plant is heated in a hot bath of 60° C. while being rotated, and is decompressed up to 7 kPa with careful attention to bumping, and thus the solvent is removed. When a solvent collected amount is 1100 parts by weight, the egg plant flask is returned to an ordinary pressure, and the egg plant flask is subjected to water cooling, and thus a dispersion is obtained. There is no solvent odor in the obtained dispersion. A volume average particle diameter of composite particles containing a thermosetting polyester resin and a thermosetting agent in this dispersion is 160 nm.

After that, 2% by weight of an anionic surfactant (Dowfax 2A1, manufactured by The Dow Chemical Company, an effective component amount of 45% by weight) is added and mixed with respect to the resin content in the dispersion as an effective component, and ion exchange water is added, and thus the mixture is adjusted such that a solid content concentration is 20% by weight. Accordingly, a composite particle dispersion (E3) containing a polyester resin and a curing agent is obtained.

Preparation of Thermosetting Polyester Resin Particle Dispersion (E4)

A thermosetting polyester resin particle dispersion (E4) is obtained in the same condition as that of preparing the composite particle dispersion (E1) except that the thermosetting polyester resin (PES2) is 300 parts by weight, and a blocked isocyanate curing agent, benzoin, and an acrylic oligomer are not added.

Preparation of Colored Powder Coating Material (PCE3)

Aggregation Step

Composite particle dispersion (E3): 325 parts by weight (a solid content of 65 parts by weight)

Coloring agent dispersion (C1): 3 parts by weight (a solid content of 0.75 parts by weight)

Coloring agent dispersion (W1): 150 parts by weight (a solid content of 37.5 parts by weight)

The components described above are sufficiently mixed and dispersed in a stainless steel round flask by a homogenizer (Ultra-Turrax T50, manufactured by IKA Japan K.K.). Subsequently, pH is adjusted to be 2.5 by using a 1.0% aqueous nitric acid solution. 0.50 parts by weight of a 10% aqueous polyaluminum chloride solution is added thereto, and a dispersion operation is continuously performed by Ultra-Turrax.

A stirrer and a mantle heater are disposed, and the slurry is heated up to 40° C. while the number of rotations of the stirrer is suitably adjusted such that the slurry is sufficiently stirred, and is maintained at 40° C. for 15 minutes, then when a volume average particle diameter is 3.5 μm, 100 parts by weight of the thermosetting polyester resin dispersion (E4) is slowly put into the slurry.

Coalescence Step

After maintaining the state after putting the thermosetting polyester resin dispersion (E4) into the slurry for 30 minutes, pH is set to 6.0 by using a 5% aqueous sodium hydroxide solution. After that, the slurry is heated up to 85° C. and maintained for 2 hours. Substantially sphered particles are observed by an optical microscope.

Filtration, Washing, and Drying Step

After finishing the reaction, the solution in the flask is cooled, and a solid content is obtained by filtration. Next, this solid content is sufficiently washed by ion exchange water, and then is subjected to solid-liquid separation by Nutsche type suction filtration, and thus a solid content is obtained again.

Next, the solid content is re-dispersed in 3 liters of ion exchange water at 40° C., and is stirred and washed at 300 rpm for 15 minutes. A solid content which is obtained by repeating this washing operation five times and then being subjected to solid-liquid separation by Nutsche type suction filtration is dried for 12 hours in vacuum, then 0.5 parts by weight of hydrophobic silica particles (a primary particle diameter of 16 nm) are mixed with respect to 100 parts by weight of the solid content, and thus a colored powder coating material of a polyester resin (PCE3) is obtained.

Powder particles of the colored powder coating material have a volume average particle diameter D50v of 4.5 μm, a volume average particle size distribution index GSDv of 1.23, and average circularity of 0.99.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

In addition, a content of aluminum ions in the colored powder coating material (the powder particles thereof) is 0.02% by weight.

Comparative Test Example 1: Colored Powder Coating Material of Polyester Resin (PCEX1)

A colored powder coating material of a polyester resin (PCEX1) is obtained in the same condition as that in Test Example 2 except that the composite particle dispersion (E1) is 400 parts by weight, and 100 parts by weight of the thermosetting polyester resin particle dispersion (E2) is not added.

Powder particles of the colored powder coating material have a volume average particle diameter D50v of 7.5 μm, a volume average particle size distribution index GSDv of 1.40, and average circularity of 0.98.

The colored powder coating material (the powder particles thereof) is embedded in an epoxy resin, then is cut, and a cross-sectional image of the powder particles is observed by a transmission electron microscope, and thus it is confirmed that surfaces of the powder particles are not covered with a resin covering portion but an additive which is considered as a curing agent is exposed to the surfaces of the powder particles.

A content of aluminum ions in the colored powder coating material (the powder particles thereof) is 0.07% by weight.

Comparative Test Example 2: Clear Powder Coating Material of Acrylic Resin (PCAX1)

A clear powder coating material of an acrylic resin (PCAX1) is obtained in the same condition as that in Test Example 1 except that the polyaluminum chloride is decreased to 0.1 parts by weight, and 40 parts by weight of a 10% aqueous nitrilotriacetic acid (NTA) metallic salt solution (Chelest 70: manufactured by Chelest Corporation) is added, and then the pH is set to be 6.0 by using a 5% aqueous sodium hydroxide solution in the coalescence step.

Powder particles of the clear powder coating material have a volume average particle diameter D50v of 9.0 µm, a volume average particle size distribution index GSDv of 1.53, and average circularity of 0.99.

The clear powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

A content of aluminum ions in the clear powder coating material (the powder particles thereof) is 0.001% by weight.

Comparative Test Example 3: Clear Powder Coating Material of Acrylic Resin (PCAX2)

A clear powder coating material of an acrylic resin (PCAX2) is obtained in the same condition as that in Test Example 1 except that the polyaluminum chloride is increased to 3 parts by weight.

Powder particles of the clear powder coating material have a volume average particle diameter D50v of 8.2 µm, a volume average particle size distribution index GSDv of 1.30, and average circularity of 0.95.

The clear powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

A content of aluminum ions in the clear powder coating material (the powder particles thereof) is 0.25% by weight.

Comparative Test Example 4: Colored Powder Coating Material of Polyester Resin (PCEX2)

A clear powder coating material of a polyester resin (PCEX2) is obtained in the same condition as that in Test Example 6 except that the polyaluminum chloride is decreased to 0.2 parts by weight, and 40 parts by weight of a 10% aqueous nitrilotriacetic acid (NTA) metallic salt solution (Chelest 70: manufactured by Chelest Corporation) is added, and then the pH is set to be 6.0 by using a 5% aqueous sodium hydroxide solution in the coalescence step. Powder particles of the colored powder coating material have a volume average particle diameter D50v of 5.0 µm, a volume average particle size distribution index GSDv of 1.55, and average circularity of 0.99.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

A content of aluminum ions in the colored powder coating material (the powder particles thereof) is 0.0016% by weight.

Test Example 7: Colored Powder Coating Material of Polyester Resin (PCE4)

A colored powder coating material of a polyester resin (PCEX4) is obtained in the same condition as that in Test Example 6 except that the polyaluminum chloride is increased to 2 parts by weight. Powder particles of the colored powder coating material have a volume average particle diameter D50v of 5.5 µm, a volume average particle size distribution index GSDv of 1.30, and average circularity of 0.97.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

A content of aluminum ions in the colored powder coating material (the powder particles thereof) is 0.22% by weight.

Test Example 8: Colored Powder Coating Material of Polyester Resin (PME1)

A colored powder coating material (PME1) is obtained by the same method as that of the colored powder coating material (PGE1) in Test Example 2 except that the composite particle dispersion (E1) is 306.5 parts by weight, and 4.8 parts by weight of the coloring agent dispersion (M1) is used instead of the coloring agent dispersion (C1).

Powder particles of the colored powder coating material have a volume average particle diameter D50v of 6.4 µm, a volume average particle size distribution index GSDv of 1.23, and average circularity of 0.98.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

In addition, a content of aluminum ions in the colored powder coating material (the powder particles thereof) is 0.1% by weight.

Test Example 9: Colored Powder Coating Material of Polyester Resin (PME2)

A colored powder coating material (PME2) is obtained by the same method as that of the colored powder coating material (PCE1) in Test Example 2 except that the composite particle dispersion (E1) is 305 parts by weight, and 6 parts by weight of the coloring agent dispersion (M2) is used instead of the coloring agent dispersion (C1).

Powder particles of the colored powder coating material have a volume average particle diameter D50v of 6.6 µm, a volume average particle size distribution index GSDv of 1.22, and average circularity of 0.98.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

In addition, a content of aluminum ions in the colored powder coating material (the powder particles thereof) is 0.1% by weight.

Test Example 10: Colored Powder Coating Material of Polyester Resin (PYE1)

A colored powder coating material (PYE1) is obtained by the same method as that of the colored powder coating material (PGE1) in Test Example 2 except that the composite particle dispersion (E1) is 302.5 parts by weight, and 8 parts by weight of the coloring agent dispersion (Y1) is used instead of the coloring agent dispersion (C1).

Powder particles of the colored powder coating material have a volume average particle diameter D50v of 6.8 μm, a volume average particle size distribution index GSDv of 1.24, and average circularity of 0.96.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

In addition, a content of aluminum ions in the colored powder coating material (the powder particles thereof) is 0.12% by weight.

Test Example 11: Colored Powder Coating Material of Polyester Resin (PKE1)

A colored powder coating material (PKE1) is obtained by the same method as that of the colored powder coating material (PGE1) in Test Example 2 except that the composite particle dispersion (E1) is 309 parts by weight, and 2.8 parts by weight of the coloring agent dispersion (K1) is used instead of the coloring agent dispersion (C1).

Powder particles of the colored powder coating material have a volume average particle diameter D50v of 6.5 μm, a volume average particle size distribution index GSDv of 1.22, and average circularity of 0.98.

The colored powder coating material (the powder particles thereof) is embedded in an epoxy resin, then is cut, and a cross-sectional image of the powder particles is observed by a transmission electron microscope, and thus it is confirmed that surfaces of the powder particles are covered with a resin covering portion.

In addition, a content of aluminum ions of the colored powder coating material (the powder particles thereof) is 0.09% by weight.

Evaluation

Preparation of Coating Film Sample of Powder Coating Material

A test panel of a zinc phosphate treated steel plate is coated with the powder coating material obtained by each Example by an electrostatic coating method or the like, and then is heated (baked) at a heating temperature of 180° C. and for a heating time of 1 hour, and thus a coating film sample a thickness of 30 μm is obtained.

Evaluation of Smoothness of Coating Film

A center line average roughness (hereinafter, referred to as "Ra". Unit: μm) is measured with respect to a surface of the coating film sample by using a surface roughness measuring device (SURFCOM 1400A, manufactured by Tokyo Seimitsu Co., Ltd.). Surface smoothness is decreased as a figure of Ra is increased, and a preferable level is 0.5 μm.

Evaluation of Glossiness of Coating Film

A 60° specular gloss value (unit: %) is measured with respect to the surface of the coating film sample by using a glossimeter (Micro-gloss, manufactured by BYK Additives & Instruments). High gloss is exhibited as a figure of the 60° specular gloss value is increased, and a preferable level is greater than or equal to 90%.

Evaluation of Blocking Resistance

The powder coating material obtained by each Example is kept in a thermohygrostat bath which is controlled such that a temperature is 50° C., and humidity is 50 RH % for 17 hours, and then a passing amount of a sieve of 200 mesh (a mesh size of 75 microns) is adjusted by using an oscillation sieve, and is evaluated according to the following basis.

G1 (O): passing amount is greater than or equal to 90%
NG (X): passing amount is less than 90%

The details of each Example and evaluation results thereof are shown in Table 1.

TABLE 1

| | | Test Example 1 | Test Example 2 | Test Example 3 | Test Example 4 | Comparative Test Example 1 | Comparative Test Example 2 | Comparative Test Example 3 |
|---|---|---|---|---|---|---|---|---|
| Powder Coating Material Property | Sample ID | PCA1 | PCE1 | PCE2 | PCA2 | PCEX1 | PCAX1 | PCAX2 |
| | D50v (μm) | 5.9 | 6.5 | 6.8 | 7.0 | 7.5 | 9.0 | 8.2 |
| | GSDv | 1.20 | 1.24 | 1.22 | 1.35 | 1.40 | 1.53 | 1.30 |
| | Average Circularity | 0.99 | 0.98 | 0.99 | 0.97 | 0.98 | 0.99 | 0.95 |
| | Presence or Absence of Resin Covering Portion | Present | Present | Present | Present | Absent | Present | Present |
| | Content of Metallic Ion (%) | 0.08 | 0.1 | 0.005 | 0.17 | 0.07 | 0.001 | 0.25 |
| Evaluation | Surface Roughness of Coating Film Ra (μm) | 0.3 | 0.3 | 0.2 | 0.4 | 0.6 | 0.7 | 0.8 |
| | Glossiness of Coating Film % | 96 | 95 | 97 | 95 | 92 | 87 | 77 |
| | Blocking Resistance of Powder Coating Material | G1 (O) | G1 (O) | G1 (O) | G1 (O) | NG (X) | G1 (O) | G1 (O) |

TABLE 1-continued

| | | Test Example 5 | Test Example 6 | Comparative Test Example 4 | Test Example 7 | Test Example 8 | Test Example 9 | Test Example 10 | Test Example 11 |
|---|---|---|---|---|---|---|---|---|---|
| Powder Coating Material Property | Sample ID | PCA3 | PCE3 | PCEX2 | PCE4 | PME1 | PME2 | PYE1 | PKE1 |
| | D50v (μm) | 13.5 | 4.5 | 5.0 | 5.5 | 6.4 | 6.6 | 6.8 | 6.5 |
| | GSDv | 1.23 | 1.23 | 1.55 | 1.30 | 1.23 | 1.22 | 1.24 | 1.22 |
| | Average Circularity | 0.98 | 0.99 | 0.99 | 0.97 | 0.98 | 0.98 | 0.96 | 0.98 |
| | Presence or Absence of Resin Covering Portion | Present | Present | Present | Present | Present | Present | Present | Present |
| | Content of Metallic Ion (%) | 0.03 | 0.02 | 0.0016 | 0.22 | 0.1 | 0.1 | 0.12 | 0.09 |
| Evaluation | Surface Roughness of Coating Film Ra (μm) | 0.3 | 0.1 | 0.3 | 0.6 | 0.3 | 0.3 | 0.4 | 0.2 |
| | Glossiness of Coating Film % | 95 | 98 | 95 | 90 | 95 | 94 | 91 | 95 |
| | Blocking Resistance of Powder Coating Material | G1 (O) | G1 (O) | NG (X) | G1 (O) | G1 (O) | G1 (O) | G1 (O) | G1 (O) |

From the results described above, in Test Examples, it is understood that the coating film having low surface roughness and high glossiness is obtained even when the volume average particle diameter is reduced to be less than or equal to 15 μm compared to Comparative Test Examples. In addition, in Test Examples, it is understood that the powder coating material also has excellent blocking resistance compared to Comparative Test Examples.

For this reason, it is understood that the powder coating material of Test Examples formed the coating film having high smoothness with high preservability in small amount even when the diameter of the powder particles is reduced compared to the powder coating material of Comparative Test Examples.

As described above, when the powder coating material according to this exemplary embodiment is applied to the powder coating apparatus according to this exemplary embodiment, it is understood that the thickness of the coating film is controlled with high productivity, and the coating film having high smoothness is formed in small amount even when the diameter of the powder particles is reduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A powder coating apparatus, comprising: a powder coating applicator that applies a powder coating material comprised of a thermosetting powder to a coating surface an object while charging and fluidizing the powder coating material, wherein the powder coating applicator comprises: (a) a gas inflow portion comprising an applying port arranged to face the coating surface of the object, a tube portion connected to the applying port by a wall defining the tube portion, and a transporting pipe for transporting the powder coating material to the applying port and being disposed inside of the wall of the tube portion so as to be housed within the tube portion, the tube portion having a width that is larger than a width of the transporting pipe so as to form a space between an outer wall surface of the transporting pipe and an inner wall surface of a tube portion, the space defining a gas inflow path, with a downstream end of the gas inflow path in a gas inflow direction opening to the transporting pipe through a gas inflow port, or (b) an oscillator imparting oscillation to the powder coating material and disposed in an inner wall surface around an edge portion of the applying port to apply the powder coating material to the coating surface of the object; said powder coating apparatus further comprising:

a layer thickness regulator, positioned downstream of the powder coating applicator in a process direction, comprising a cylindrical, wherein an outer circumferential surface of the cylindrical member contacts the powder coating material on the coating surface so as to form a particle layer of the powder coating material on the coating surface, the thickness of the particle layer of the powder coating material being regulated by contact with the outer circumferential surface of the cylindrical member; and a heater, wherein heat applied by the heater to the particle layer of the powder coating material while the outer circumferential surface of the cylindrical member is in contact with the particle layer of the powder coating material thermally cures the particle layer of the powder coating material, and wherein the heater comprises a lens member, arranged within an inner portion of the cylindrical member of the layer thickness regulator, that focuses a laser beam, and wherein the heater applies heat through the outer circumferential surface of the cylindrical member to the particle layer of the powder coating material on the coating surface.

2. The powder coating apparatus according to claim 1, wherein the layer thickness regulator regulates the thickness of the particle layer of the powder coating material while the layer thickness regulator is rotated.

3. The powder coating apparatus according to claim 1, wherein a sliding member is disposed between an inner circumferential surface of the cylindrical member of the layer thickness regulator and the lens member, and a lubricant-supplying member supplying a lubricant from a housing to the inner circumferential surface of the cylindrical member of the layer thickness regulator, are also disposed in the inner portion of the layer thickness regulator.

4. The powder coating apparatus according to claim 1, wherein the powder coating applicator includes both the gas inflow portion and the oscillator.

5. The powder coating apparatus according to claim 1, wherein gas flows through the gas inflow path to the gas inflow port with use of a pump.

6. The powder coating apparatus according to claim 1, wherein the heater includes a light irradiation unit that irradiates the particle layer of the powder coating material with light to thereby heat the particle layer of the powder coating material when the thickness of the article layer is regulated by the layer thickness regulator.

7. The powder coating apparatus according to claim 6, wherein the light irradiation unit includes a light source emitting a laser beam.

8. The powder coating apparatus according to claim 7, wherein the laser beam has a wavelength from 760 nm to 900 nm.

9. The powder coating apparatus according to claim 1, wherein a volume particle size distribution index GSDv of particles of the powder coating material is less than or equal to 1.50.

10. The powder coating apparatus according to claim 1, wherein average circularity of particles of the powder coating material is greater than or equal to 0.96.

11. The powder coating apparatus according to claim 1, wherein particles of the powder coating material have a core-shell structure.

12. The powder coating apparatus according to claim 11, wherein a core of the particles includes a thermosetting resin and a thermosetting agent.

13. The powder coating apparatus according to claim 12, wherein the thermosetting resin is a thermosetting (meth) acrylic resin.

14. The powder coating apparatus according to claim 12, wherein a number average molecular weight of the thermosetting (meth)acrylic resin is from 1,000 to 20,000.

15. The powder coating apparatus according to claim 12, wherein the thermosetting resin is a thermosetting polyester resin.

16. The powder coating apparatus according to claim 15, wherein a sum total of an acid value and a hydroxyl value of the thermosetting polyester resin is from 10 mg KOH/g to 250 mg KOH/g.

17. The powder coating apparatus according to claim 12, wherein a content of the thermosetting resin is from 20% by weight to 99% by weight with respect to all the particles of the powder coating material.

18. The powder coating apparatus according to claim 1, wherein the powder coating material includes divalent to tetravalent metallic ions.

19. The powder coating apparatus according to claim 1, wherein the powder coating material includes inorganic particles on a surface thereof.

* * * * *